(12) United States Patent
Laraqui et al.

(10) Patent No.: US 10,447,548 B2
(45) Date of Patent: Oct. 15, 2019

(54) METHODS AND ARRANGEMENTS RELATING TO COMMUNICATION BETWEEN A RADIO ACCESS NETWORK AND WIRELESS DEVICES

(71) Applicant: TELEFONAKTIEBOLAGET LM ERICSSON (PUBL), Stockholm (SE)

(72) Inventors: Kim Laraqui, Solna (SE); Boris Dortschy, Hägersten (SE); Erik Rickard Söderqvist, Tullinge (SE); Elmar Trojer, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 528 days.

(21) Appl. No.: 15/106,126

(22) PCT Filed: Dec. 20, 2013

(86) PCT No.: PCT/SE2013/051609
§ 371 (c)(1),
(2) Date: Jun. 17, 2016

(87) PCT Pub. No.: WO2015/094071
PCT Pub. Date: Jun. 25, 2015

(65) Prior Publication Data
US 2016/0337194 A1    Nov. 17, 2016

(51) Int. Cl.
*H04L 12/24* (2006.01)
*H04W 88/08* (2009.01)
*H04W 28/18* (2009.01)

(52) U.S. Cl.
CPC .......... *H04L 41/12* (2013.01); *H04L 41/0803* (2013.01); *H04W 28/18* (2013.01); *H04W 88/085* (2013.01)

(58) Field of Classification Search
None
See application file for complete search history.

(56) References Cited

U.S. PATENT DOCUMENTS

2003/0188319 A1* 10/2003 Weissman ............. H04M 7/006
725/106
2011/0130163 A1* 6/2011 Saban ................. H04W 88/085
455/517

(Continued)

FOREIGN PATENT DOCUMENTS

EP      2501000 A1    9/2012
WO   2013142662 A2   9/2013

OTHER PUBLICATIONS

Shankaranarayanan, et al., Multiport Wireless Access System Using Fiber/Coax Networks for Personal Communications Services (PCS) and Subscriber Loop Applications, GLOBECOM Communication Theory Mini-Conference, Nov. 13-17, 1995, pp. 977-981.

*Primary Examiner* — Ayaz R Sheikh
*Assistant Examiner* — Mariela Vidal Carpio

(57) ABSTRACT

A head-end system and radio head apparatuses are connected to a cable network for wired transmission of radio signals. The head-end system obtains information identifying available IFs, and receives, from a RAN, information identifying communication RFs. The head-end system sends, to the radio head apparatuses, configuration instructions. The head-end system communicates data between the RAN and said radio head apparatuses, via broadcast of one or more radio signals in the cable network, located within the one or more communication IF bands. The radio head apparatuses communicate the data between the head-end system and wireless devices, via the cable network and wirelessly to/from the wireless devices using the communication RFs.

20 Claims, 10 Drawing Sheets

(56) References Cited

U.S. PATENT DOCUMENTS

| | | | |
|---|---|---|---|
| 2011/0158149 A1* | 6/2011 | Mugulavalli | H04H 20/63 370/312 |
| 2012/0030294 A1* | 2/2012 | Piernot | G06F 17/30902 709/206 |
| 2012/0264367 A1* | 10/2012 | Aguirre | H04W 84/14 455/3.06 |
| 2012/0315916 A1 | 12/2012 | Van Phan et al. | |
| 2012/0321314 A1 | 12/2012 | Oren et al. | |
| 2013/0070742 A1 | 3/2013 | Picker et al. | |
| 2016/0205570 A1* | 7/2016 | Bedekar | H04W 24/02 370/252 |

* cited by examiner

METHODS AND ARRANGEMENTS RELATING TO COMMUNICATION BETWEEN A RADIO ACCESS NETWORK AND WIRELESS DEVICES

This application is a 371 of International Application No. PCT/SE2013/051609, filed Dec. 20, 2013, the disclosure of which is fully incorporated herein by reference.

TECHNICAL FIELD

Embodiments herein relate to a method performed by a head-end system, the head end system, a method performed by a radio-head apparatus and the radio head apparatus. In particular embodiments herein relate to managing communication of data between a Radio Access Network, "RAN", e.g. of a telecommunications system, and one or more wireless devices.

BACKGROUND

Communication devices such as wireless devices may be also known as e.g. user equipments (UEs), mobile terminals, wireless terminals and/or mobile stations. A wireless device is enabled to communicate wirelessly in a cellular communications network, wireless communications system, mobile communication system, or radio communications system, sometimes also referred to as a cellular radio system, cellular network or cellular communications system. These networks and systems are typically part of, or correspond to, what commonly is referred to as a telecommunications system. The communication may be performed e.g. between two wireless devices, between a wireless device and a regular telephone and/or between a wireless device and a server via a Radio Access Network (RAN) and possibly one or more core networks, comprised within the cellular communications network. The wireless device may further be referred to as a mobile telephone, cellular telephone, laptop, Personal Digital Assistant (PDA), tablet computer, just to mention some further examples. The wireless device may be, for example, portable, pocket-storable, hand-held, computer-comprised, or vehicle-mounted mobile device, enabled to communicate voice and/or data, via the RAN, with another entity, such as another wireless device or a server.

The cellular communications network covers a geographical area which is divided into cell areas, wherein each cell area is served by at least one base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided according to a Radio Access Technology (RAT) and at a carrier frequency by the base station at a base station site. The base station may support one or several communication technologies, including RATs. Cells may overlap so that several cells cover the same geographical area. By the base station serving a cell is meant that the radio coverage is provided such that one or more wireless devices located in the geographical area where the radio coverage is provided may be served by the base station. One base station may serve one or several cells. When one base station serves several cells, these may be served according to the same or different RATs, and/or may be served at same or different carrier frequencies. The base stations communicate over the air interface operating on radio frequencies with the wireless device within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Special Mobile). In 3rd Generation Partnership Project (3GPP) Long Term Evolution (LTE), base stations, which may be referred to as eNodeBs or eNBs, may be directly connected to other base stations and may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing WCDMA. Moreover, the 3GPP has undertaken to evolve further the UTRAN and GSM based radio access network technologies, for example into evolved UTRAN (E-UTRAN) used in LTE. Standards resulting from standardization by 3GPP may commonly be referred to as 3GPP standards.

The expression downlink (DL) is used for the transmission path in the direction from the RAN to the wireless device. The expression uplink (UL) is used for the transmission path in the opposite direction i.e. from the wireless device to the RAN.

Demand for higher wireless capacity is increasing very fast, particularly indoor where many bandwidth demanding applications are being used, e.g. including watching streaming video and/or uploading video content. At the same time it is in such environments also a relative large amount and often high density of users compared to many more mobile environments and situations. It is therefore an increasing need and demand for increased possibility to be able to serve wireless devices in indoor environments and with comparatively high capacity in both the downlink and uplink.

SUMMARY

An object is to provide improvements with regard to the possibility of serving wireless devices in indoor environments.

According to a first aspect of embodiments herein, the object is achieved by a method, performed by a head-end system, for managing communication of data between a Radio Access Network (RAN) and one or more wireless devices. Said head-end system and one or more radio head apparatuses are being connected to a cable network for wired transmission of radio signals. The head-end system obtains information identifying available Intermediate Frequencies (IFs) associated with the cable network, which available IFs are un-occupied frequencies in the cable network. The head-end system receives, from the RAN, information at least identifying communication Radio Frequencies (RFs) to be used in wireless communication of the data between the RAN and said one or more wireless devices. The head-end system sends, to the one or more radio head apparatuses, one or more configuration instructions that identifies the communication RFs, and one or more communication IF bands comprised in the available IFs. The one or more configuration instructions also instructs the one or more radio head apparatuses to use the communication RFs for communication with the one or more wireless devices, to use the one or more communication IF bands for communication over the cable network and how each communication IF band relates to the communications RFs. The head-end system communicates the data between the RAN and said one or more radio head apparatuses, via broadcast of one or more radio signals in the cable network. The one or more radio signals comprise the data and are located within the one or more communication IF bands.

According to a second aspect of embodiments herein, the object is achieved by computer program that when executed by a processor causes a head-end system to perform the method according to the first aspect.

According to a third aspect of embodiments herein, the object is achieved by a computer program product comprising a data carrier and a computer program according to the second aspect stored on the data carrier.

According to a fourth aspect of embodiments herein, the object is achieved by a method, performed by a radio head apparatus, for managing communication of data between a RAN and one or more wireless devices. Said radio head apparatus and a head-end system are connected to a cable network for wired transmission of radio signals. The radio head apparatus receives, from the head-end system, one or more configuration instructions identifying communication RFs and one or more communication IF bands. The one or more communication IF bands are comprised in available IFs that are associated with the cable network and are un-occupied frequencies in the cable network. The one or more configuration instructions further instructs the radio head apparatus to use the communication RFs for communication with the one or more wireless devices, to use the one or more communication IF bands for communication over the cable network and how each communication IF band relates to the communications RFs. The radio head apparatus communicates, based on the received one or more configuration instructions, the data between the head-end system and said one or more wireless devices, via broadcast of one or more radio signals in the cable network, and via wireless transmission, to and/or from the one or more wireless devices, using the communication RFs. The one or more radio signals comprise the data and are located within the one or more communication IF bands.

According to a fifth aspect of embodiments herein, the object is achieved by a computer program that when executed by a processor causes a radio head apparatus to perform the method according to the fourth aspect.

According to a sixth aspect of embodiments herein, the object is achieved by a computer program product comprising a data carrier and a computer program according to the fifth aspect stored on the data carrier.

According to a seventh aspect of embodiments herein, the object is achieved by a head-end system for managing communication of data between a RAN and one or more wireless devices when said head-end system and one or more radio head apparatuses are connected to a cable network for wired transmission of radio signals. The head-end system is configured to obtain information identifying available IFs associated with the cable network and that are un-occupied frequencies in the cable network. The head-end system is further configured to receive, from the RAN, information at least identifying communication RFs to be used in wireless communication of the data between the RAN and said one or more wireless devices. The head-end system is configured to send, to the one or more radio head apparatuses, one or more configuration instructions identifying the communication RFs and one or more communication IF bands comprised in the available IFs. The head-end system is configured to instruct the one or more radio head apparatuses to use the communication RFs for communication with the one or more wireless devices, to use the one or more communication IF bands for communication over the cable network and how each communication IF band relates to the communications RFs. Moreover, the head-end system is configured to communicate the data between the RAN and said one or more radio head apparatuses, via broadcast of one or more radio signals in the cable network. The one or more radio signals comprise the data and are located within the one or more communication IF bands.

According to an eighth aspect of embodiments herein, the object is achieved by a radio head apparatus for managing communication of data between a RAN and one or more wireless devices when said radio head apparatus and a head-end system are connected to a cable network for wired transmission of radio signals. The radio head apparatus is configured to receive, from the head-end system, one or more configuration instructions identifying communication RFs, and one or more communication IF bands comprised in available IFs that are un-occupied frequencies in the cable network. The one or more configuration instructions further instructs the radio head apparatus to use the communication RFs for communication with the one or more wireless devices, to use the one or more communication IF bands for communication over the cable network and how each communication IF band relates to the communications RFs. Moreover, the radio head apparatus communicates, based on the received one or more configuration instructions, the data between the head-end system and said one or more wireless devices, via broadcast of one or more radio signals in the cable network (130) and via wireless transmission, to and/or from the one or more wireless devices, using the communication RFs. The one or more radio signals comprise the data and are located within the one or more communication IF bands.

Embodiments herein enable flexible and scalable extension to a conventional RAN and also enable cost efficient implementation. The cable network may be an existing one already in place in a building and used by one or more other communication technologies, but that still have spare capacity in the form of available IFs. By communicating over the cable network using the communication IF bands among the available IFs etc., as described above, embodiments herein enable coexistence with other communication technologies in the cable network. Embodiments herein are at the same time compatible for data communication between the RAN and the one or more wireless devices according to practically any RAT, and multi-RAT. As the cable network may be accessible inside a building and this typically always is the case when an already existing cable network is used, and in view of the above-mentioned advantages, the embodiments herein provides an improvement with regard to the possibility of serving of wireless devices in indoor environments.

BRIEF DESCRIPTION OF THE DRAWINGS

Examples of embodiments herein are described in more detail with reference to the appended schematic drawings.

DETAILED DESCRIPTION

Before presenting embodiments herein, and as part of the development towards embodiments herein, the situation and problem indicated in the Background will be further discussed.

Many building and thus indoor environments already have installed cable networks, typically coaxial cable based, for different purposes. Many are in active use others have been abandoned owing to technology shift, e.g. going from TV over coaxial cable to over optical fiber. In general, coaxial based cable networks are used mainly in two application areas: To support Hybrid Fiber Coax (HFC) services to residential users, and to provide Distributed Antenna System (DAS) services in enterprises and other public venues.

Underlying embodiments herein is the realization that connecting e.g. scheduled RATs such as LTE or WCDMA/HSPA, to e.g. a coaxial cable based cable network, would enable advantageous and simple solutions at installation premises, e.g. allowing low initial costs and smooth capacity increase. However, RATs in general use various high frequencies and often well above, or conflicting with, the frequencies available and used in many existing coaxial cable based cable networks. Also, existing coaxial cable based cable networks cannot expand to higher frequency bands due to limitations of the system solutions they are used in. Thus, DAS systems cannot use higher frequency bands unless the same frequencies are used over the radio access by the antennas connected over the coaxial cables. HFC will not use higher frequencies because this would require topological changes of their existing solutions (typically, HFC are designed based on the assumption of 300 meters of coaxial cables in the distribution network). In addition, it would then require a new standard for e.g. Data Over Cable Service Interface Specifications (DOCSIS). This in turn would require changes on the end-user side, e.g. new Customer Premises Equipment (CPE) and modems.

At the same time, in both of the above mentioned application areas, HFC and DAS, the typical coaxial cables used will only employ a part of the available bandwidth. As an example, a typical HFC system will use roughly 700 MHz of the available 2.5 GHz available over the coaxial cable, thus leaving two thirds of the resources unused. As another example, a DAS system providing 20 MHz LTE indoor for a couple of operators will leave over 90% of the coaxial cable capacity untapped. Hence, when a coaxial cable based cable network is available there is typically available frequencies, and thus capacity, that may be used, although not necessarily the right frequencies for compatibility with a certain RAT.

The development towards embodiments herein, as will be presented next, is partly based on the realization that it would be particular advantageous to come up with a solution that enables use of available capacity in many existing cable networks, provides general compatibility with RATs, and cost efficient realization.

Figure 1:
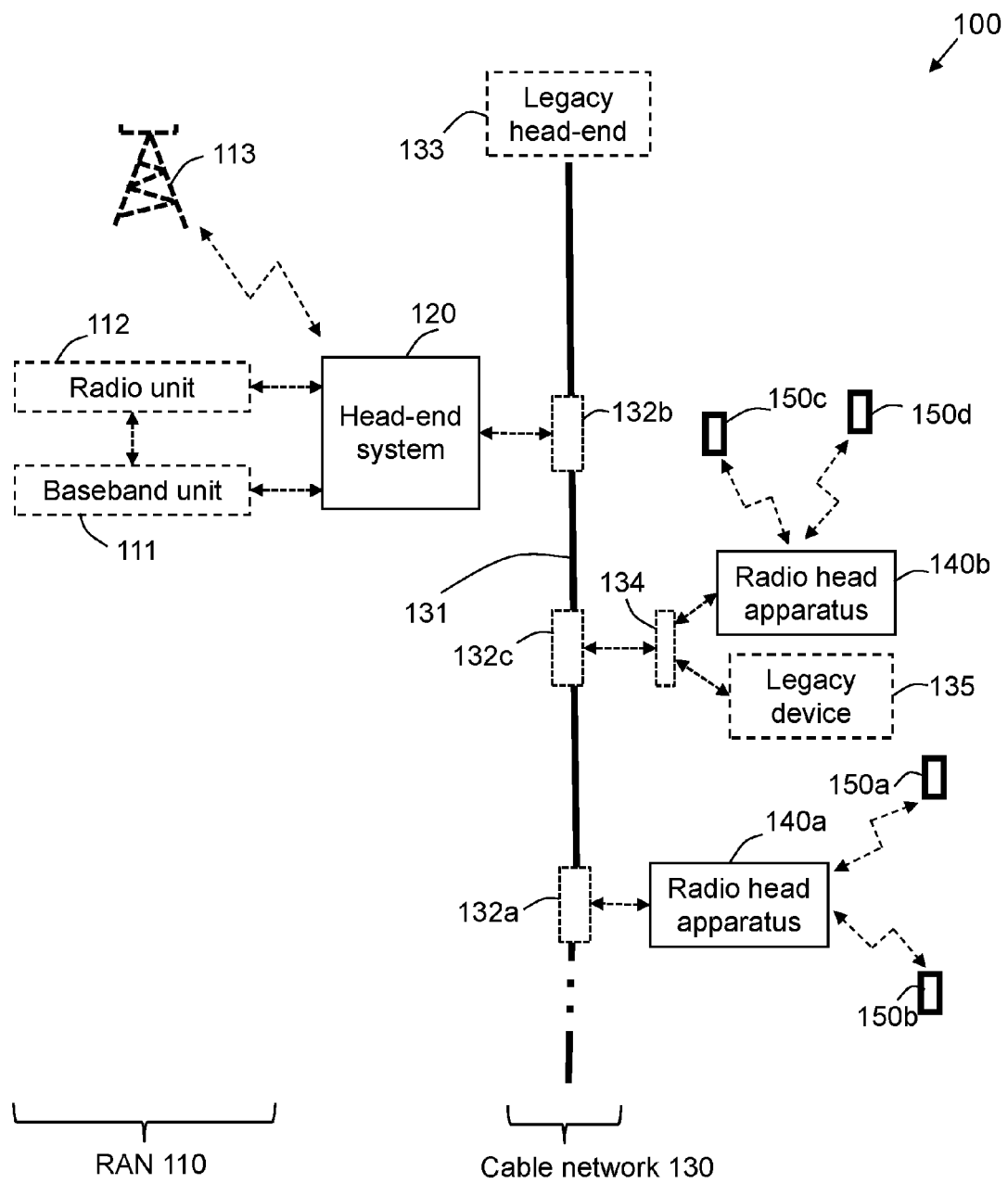
FIG. 1 is a schematic block diagram depicting an example of a communications system in relation to which embodiments herein are explained.

FIG. 1 is a schematic block diagram depicting an example of a wireless communications system 100, in relation to which the embodiments herein will be explained. The wireless communications system 100 may support one or more RATs, e.g. LTE, UMTS, GSM, WiFi etc. The wireless communications system 100 comprises a RAN 110 of which exemplifying and optional parts are shown, viz. a baseband unit 111, a radio unit 112, and a base station 113. How these in particular may relate to and be used with embodiments herein will be further discussed below. The RAN 110 may be according to at least one of said one or more RATs and e.g. be of a conventional type, e.g. of any of the types mentioned in the Background, such as UTRAN, E-UTRAN, just to mention some examples. The RAN 110 may accordingly be comprised in a corresponding type of radio communication system, such as based on UMTS, LTE, just to mention some examples. Furthermore, one or more wireless devices 150*a-d* are shown in FIG. 1. Embodiments herein, as will be explained in detail below, relate to communication of data between the RAN 120 and the one or more wireless devices 150*a-d*. As used herein, communication of data should be given a broad definition, including e.g. data being communicated to accomplish real time voice and/or video traffic, data being communicated when streaming media content, when downloading and/or uploading files etc. As indicated in the Background a RAN, as the RAN 110, although not shown here, further connects to other networks, including e.g. the Internet and one or more core networks. Also, although not shown in the figure, the base station 113 and the baseband unit 111, and also the radio unit 112, have further connections to the RAN 110 and/or e.g. to a core network being part of the mobile communication system comprising the RAN 110. For example in case of E-UTRAN and LTE, there would be connections to a Mobility management Entity (MME) and Serving GateWay (S-GW) of an Evolved Packet Core (EPC) network. There is typically also connections to at least one Operational Support System (OSS) that may connect to and/or be at least partly comprised in one or many network nodes of the mobile communication system comprising the RAN 110. An OSS is typically employed by all communication service providers. An OSS is typically configured to perform management, inventory, engineering, planning, and repair functions.

The shown wireless communications system 100 also comprises a head-end system 120 and a cable network 130 for wired transmission of radio signals. The cable network 130 comprises one or more cables 131 that are interconnected. A typical and preferred example of cable network for wired transmission of radio signals is a coaxial cable network that also may be referred to as coaxial distribution network, and includes e.g. cable networks based on HFC and such as used for DAS, as mentioned above. Also other type of cable network for wired transmission of radio signals, typically based on shielded cables, with corresponding transmission capabilities for radio signals as a coaxial cable may be used. That is with an effective and useful bandwidth for transmission of radio signals in a domain of up to several hundreds of MHz or even one or several GHz. The cable network 130 for wired transmission of radio signals may be described as being broadcast distributive, meaning that that radio signals being transmitted in the cable network are distributed in the cable network independent on recipient, i.e. the transmission is a broadcast of the radio signals in the cable network. This is similar to how radio signals are transmitted in air, where, as long as within coverage, the radio signal is there to be picked up by an antenna. Here this may instead be accomplish by connecting to a cable of the cable network. Note however that frequency selective filters, or such filtering effect, may stop all or some of the radio signals to propagate in certain parts of the cable network, but such filtering does not change the broadcast nature and has nothing to do with the recipients as such.

The head-end system 120 is a system for providing communication between the RAN 110 and the cable network 130 and may comprise distributed physical parts but that typically are at least co-located and physically connected to each other, e.g. in a head-end room, server room or similar that provide connection to the cable network 130. In general the head-end system 120 should be placed where it makes most sense from a performance and business perspective. It may be co-located with the legacy head end 133, or legacy systems, such as DAS or HFC, or it can be located elsewhere. The shorter the cables involved, the higher frequencies may be used over the coaxial cable and hence increased capacity. However, the parts of the head-end system 120 may as well be comprised in and may even be integrated in a single physical device or unit. In such case the head-end system 120 may rather be considered a head-end device. It should be noted that the radio unit 112 may be co-located and/or integrated with the head-end system 120. In such embodiments also the baseband unit 111 may be co-located and/or integrated with the head-end system 120. In other embodiments the radio unit 112 and/or the baseband unit 111 may instead e.g. be located in a nearby base station cabinet or similar. The head-end system 120 will be further described below in accordance with embodiments herein.

Moreover, the shown wireless communications system 100 comprises an legacy head-end 133 of the cable network 130, e.g. a head-end for distribution of TV-signals in the cable network 130 or radio signals for DAS. In case of DAS the legacy head-end 133 typically contains one or several RBS connecting to the cable network 130, and in case of TV it may be one or several HFC nodes.

Moreover the wireless communications system 100 also comprises connectors 132*a*-15*c* for connecting to the cable network 130, which connectors typically are in the form of combined power splitters/combiners that may be part of an existing installation of the cable network 130, e.g. corresponding to wall sockets for TV antenna cables. Any filtering may be bypassed to enable the connector to act as a signal sending and/or signal receiving connection point to the cable network 130 and to be able to utilize a full frequency spectrum of the cable network 130. The head-end system 120 is in FIG. 1 shown connected to the cable network 130 through connector 132*a*. Note however that in some embodiments there may an installation of the head-end system 120 that connects more directly and/or may be more fully integrated with the cable network 130, e.g. instead of the legacy head-end system 133 there may be the head-end system, 120. This may be the situation in case of installation in a cable network 130 that is unused, e.g. after an existing one have been previously abandoned and for example a previous legacy head-has been removed. A radio signal transmitted in the cable network 130 from any device connected thereto is theoretically receivable by any other device connected thereto. The radio signal may be considered to be broadcasted to devices connected to the cable network. This since the cable network 130 may be provide a broadcast medium, or in other words be broadcast distributive, where radio signals being transmitted therein propagate and distributes throughout the cable network 130 independent on recipient.

The legacy head-end 133 and legacy devices use frequencies in the cable network 130 that they have been configured to employ, e.g. in case of HFC, or are forced to employ in case of DAS. DAS systems over coaxial cable just carry the analogue radio signal without frequency conversions involved. The frequencies carried are hence stipulated by standards such as provided by 3GPP and International Mobile Telecommunication (IMT) requirements by the International Telecommunication Union Radio communication Sector (ITU-R).

Furthermore, the wireless communications system 100 comprises one or more radio head apparatuses 140*a*-*b* that will be further described below in accordance with embodiments herein. The one or more radio head apparatuses 140*a*-*b* are apparatuses that provide communication between the cable network 130 and the one or more wireless devices 150*a*-*d*. The one or more radio head apparatuses 140*a*-*b* communicate wirelessly with, and may provide standard radio air interface signals to, the one or more wireless devices 150*a*-*d*, e.g. radio access according to LTE, HSPA/WCDMA, GSM, WiFi etc.

The one or more radio head apparatuses 140*a*-*b* are typically connected "by wire" to the cable network, as opposed to the wireless connection to the one or more wireless devices 150*a*-*d*. The radio head apparatus 140*a* may be connected to the cable network 130 via connector 132*c*. The radio head apparatus 140*b* may be connected to the cable network 130 via connector 132*b* and an additional splitter/combiner 134 that may offer sharing of the connector 132 with a legacy device 135 operating with the legacy head-end 133 over the cable network 130. In some embodiments the additional splitter/combiner 134 is integrated in the same unit as the radio head apparatus 140*b*. For example, the radio head apparatus 140*b* may be provided as a single unit and configured to be plugged into the connector 132*c*, and which unit also comprises the additional splitter/combiner 134 configured for connection to the legacy device 135. Hence, after plug-in of a radio head apparatus to e.g. an outlet of the cable network 130 corresponding to the connector 132*c*, it may then simply be to connect the legacy device 135, e.g. a TV or a TV-decoder/media device for TV-screen connection, to an outlet of the installed radio head apparatus, which outlet corresponds to the additional splitter/combiner 134.

Note that the connectors 132*a*-*c* corresponding to splitters/combiners and the additional splitter/combiner, may act as splitter/combiner at the same time. In relation to a particular radio signal it depends on from where the radio signal is transmitted if a given splitter/combiner has a combining or splitting effect.

When it is referred herein that something is communicated, e.g. sent or received, to and/or from the RAN 110, it is implied that there is one or more networks node of the RAN involved, e.g. a node corresponding to or comprising the baseband unit 111, the radio unit 112, and/or the base station 113, and/or an OSS node, a MME node and or a S-GW node, just to mention some examples. What exact network node involved may depend on RAT involved and to some extent also on implementation of the RAN 110 and the radio communication system of the RAN 110. In a specific situation, with given RAT, RAN and radio communication system of the RAN 110, and based on context that communication with the RAN is taking place, it is within the capacity of the skilled person to realize which network node(s) that are or may be involved.

What is shown in FIG. 1 between the shown RAN 110 and the one or more wireless devices 150a-d may be considered an extension of the RAN 110, at least the parts that, in accordance with embodiments herein, relate to said communication of data. Hence, it is more or less a matter of definition whether said parts should be considered to be comprised in the RAN 110 or not. In the former case, FIG. 1 could instead be drawn with an extended RAN 110. However, for facilitating understanding in relation to a more conventional RAN, the latter case and a more conventional RAN definition are reflected in FIG. 1. It is also realized that it would rarely be correct to draw the RAN 110 in FIG. 1 so that it e.g. comprised the legacy head-end 133. However, the RAN 110 of FIG. 1 could e.g. be drawn to e.g. comprise all parts in FIG. 1 that are drawn with solid lines, except the one or more wireless devices 150a-d, i.e. alternatively the RAN 110 could comprise also the head-end system 120, the cable network 130 and the one or more radio head apparatuses 140a-b. As mentioned, with the more conventional RAN definition as reflected in FIG. 1, embodiments herein relate to communication of data between the RAN 120 and the one or more wireless embodiments 150a-d. With the "extended" RAN definition instead, embodiments herein would rather relate to communication of data in the RAN, to and/or from the one or more wireless devices 150a-d.

Functions and relations between the parts and features comprised in the communications system 100 as introduced above will be further explained and discussed below.

Figure 2:
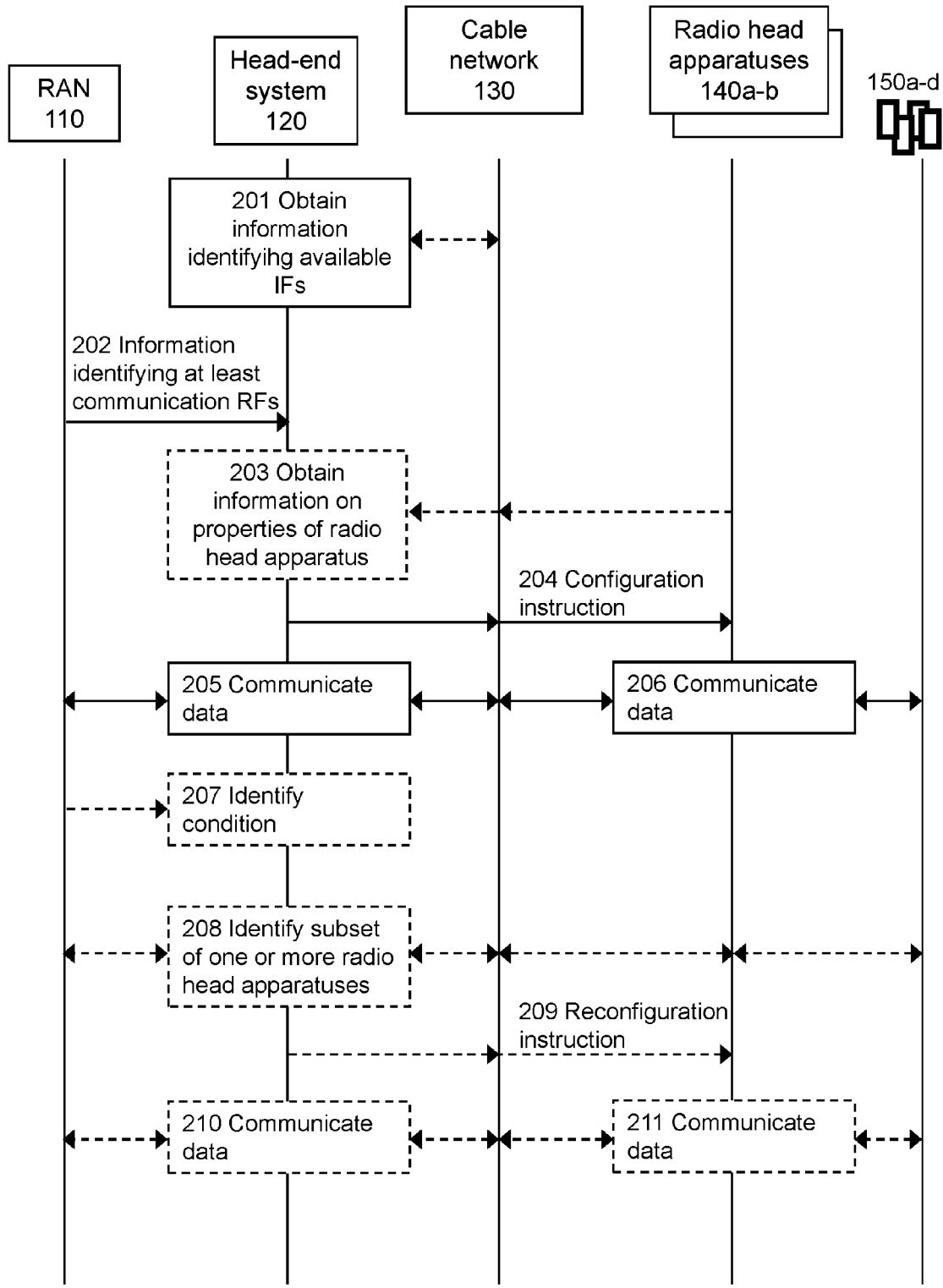
FIG. 2 is a combined signaling diagram and flowchart schematically illustrating methods according to embodiments herein.

Examples of embodiments herein relating to a method for managing communication of data between the RAN 110 of the wireless communications system 100 and the one or more wireless devices 150a-d, will now be described with reference to the combined signaling diagram and flowchart depicted in FIG. 2. As discussed above, the head-end system 120 and the radio head apparatuses 140a-b are connected to the cable network 130 for wired transmission of radio signals. In the following, when it may be involved either one or both of the radio head apparatuses 140a-b, they will be referred to as the one or more radio head apparatuses 140a-b.

The method comprises the following actions, which actions may be taken in any suitable order. Further, actions may be combined.

Action 201

The head-end system 120 obtains information identifying available Intermediate Frequencies, "IFs", associated with the cable network 130. The available IFs are un-occupied frequencies in the cable network 130.

This action may for example comprise receiving the information by eavesdropping on traffic over the cable network 130, e.g. analyzing which frequencies are already being used in the cable network 130. And/or the information may be received from an internal and/or external database with information on already occupied frequencies in the cable network 130, which already occupied frequencies relate to communication in the cable network 130 e.g. to and/or from the legacy head-end 133 and to and/or from equipment associated thereto, e.g. the legacy device 135. For example, the internal and/or external database may comprise information on frequency bands in the cable network 130 that are already allocated, such as frequency bands that the legacy head 133 and/or the legacy device 135 are configured to use for communication over the cable network 130. Also IFs that already are being used for communication over the cable network 130 by the head end system 120 and/or the one or more radio head apparatuses 140a-b, may cause occupation of frequencies. This may be kept track of separately and/or may also be comprised in the internal and/or external database.

Action 202

The head-end system 120 receives, from the RAN 110, information at least identifying communication RFs to be used in wireless communication of the data between the RAN 110 and the one or more wireless devices 150a-d.

This information may be comprised in a system information signal that may be specific for communication with the head-end system 120 or be more general, e.g. corresponding to such system information that is conventionally used by a RAT involved for setting up communication between a RAN of the involved RAT and one or more wireless devices configured for communication according to the involved RAT. For example, in LTE the system information signal may correspond to frequency bands to use and bandwidth to be used for the uplink and/or downlink signals in a Frequency Division Duplex (FDD).

The information at least identifying communication RFs may be extracted from the received system information signal by means of a receiver and/or decoder, that in some embodiments may correspond to, or be based on, a conventional wireless device, suitable for communication with the RAN 110 according to one or more RATs. That is, in some embodiments the head-end system 120 may comprise such receiver and/or decoder that may be in the form of a wireless device (not shown). Such wireless device may e.g. be configured to collect, e.g. via the base station 113, or a macro relay facility or antenna, system information data from a macro network. This can be used to assess macro network quality and availability. It may also be used to collect similar information from e.g. the radio unit 112.

Action 203

The head-end system 120 may obtain information on properties of the one or more radio head apparatuses 140a-b. The information on properties may beneficially be obtained by being received over the cable network 130 using any of the one or more control IF bands as will be discussed separately below. However, additionally or alternatively, in some embodiments it may be obtained by being retrieved from an internal or external data base (not shown) containing properties of radio head apparatuses that have been installed in and are connected to the cable network.

The information obtained in the present action may comprise information identifying supported RFs that the one or more radio head apparatuses 140a-b supports for wireless communication with the one or more wireless devices 150a-d. The obtained information may e.g. identify a carrier frequency and bandwidth of the supported RFs, transmission power of the radio head apparatus 140a etc.

Action 204

The head-end system 120 sends, to the one or more radio head apparatuses 140a-b, one or more configuration instructions. The one or more configuration instructions identify the communication RFs and one or more communication IF bands comprised in the available IFs. The one or more configuration instructions further instructs the one or more radio head apparatuses 140a-b to use the communication RFs for communication with one or more wireless devices 150a-d, to use the one or more communication IF bands for communication over the cable network 130, and how each communication IF band relates, e.g. maps, to the communications RFs. That is, information from actions 201-202 is utilized. The configuration instructions enable the head-end system 120 and the one or more radio head apparatuses 140a-b to use, i.e. operate using, frequencies in the cable network 130 that does not interfere with already existing use in the coaxial distribution system 130, e.g. according to legacy services, such as DOCSIS. The configuration instructions also enable the one or more radio head apparatuses 140a-b to know which communication RFs to use in wireless communication with the one or more wireless devices 150a-d and also enable frequency conversion between a radio signal in the communication IF band and one according to the communications RFs.

In some embodiments, when the head-end system 120 has obtained information on properties of the one or more radio head apparatuses 140a-b, e.g. as discussed above under action 203, the one or more configuration instructions are sent in response to verification, based on this obtained information, that the one or more radio head apparatuses 140a-b are suitable to be used for the communication of data. For example that they support the communication RFs etc.

In some embodiments, the one or more configuration instructions further instructs two or more radio head apparatuses, e.g. both the radio head apparatuses 140a-b, to use one and the same communication IF band among the one or more communication IF bands and the same communication RF frequencies. This may correspond to a situation where the two radio head apparatuses 140a-b provide coverage for what in the RAN 110 may be considered as one and the same cell. In at least a low load scenario this is typically preferred as it requires the least resources from the RAN and facilitate implementation owing to low complexity. There may e.g. be no need to keep track of which one of the two or more radio head apparatuses 140a-b a wireless device may actually be communicating with.

Action 205

The head-end system 120 communicates the data between the RAN 110 and the one or more radio head apparatuses 140a-b, via broadcast of one or more radio signals in the cable network 130. The one or more radio signals comprise said data and are located within the one or more communication IF bands.

In some embodiments, each one of the one or more communication IF bands are used to communicate a respective part of the data being communicated, where the respective part maps to a respective baseband signal, and/or cell, in the RAN 110. This particularly facilitates implementation and compatibility with existing RANs where each baseband signal typically is associated with a cell that thus will map to a communication IF band. The communications RFs that each communication IF band relates to may thus be RFs associated with that cell. In some embodiments it is preferred with a 1:1 mapping between a baseband signal of the RAN and a communication IF band. In this case communication over the cable network may be said to be based on frequency division since baseband signals are not communicated using shared IF bands. Frequency division for the communication using the IF bands may be preferred when capacity in the cable network 130 makes this possible since it typically offers simpler implementation and also low interference. However, time division is also possible and may be the case in some embodiments. When time division is used there may be a multiple:1 mapping between baseband signals of the RAN and a communication IF band, or a 1:1 mapping but partly overlapping IF bands. The same frequencies of communication IF bands are thus used for different baseband signals that may correspond to different cells. Each baseband signal may comprise different parts of the data being communicated and may kept apart and interference be avoided by separate transmission times instead of separate frequencies as in the case of frequency division.

Figure 3:
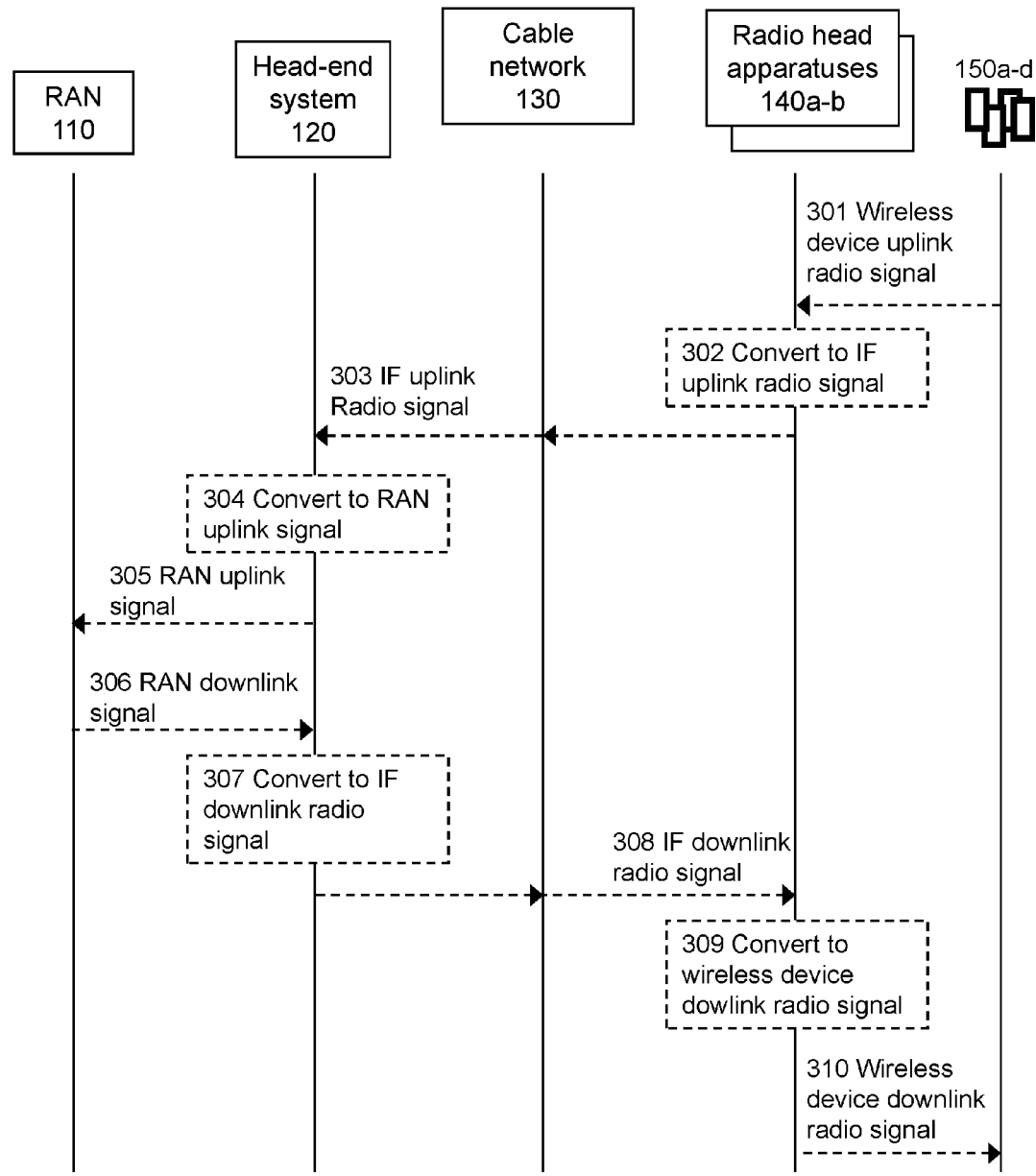
FIG. 3 is a combined signaling diagram and flowchart schematically illustrating further methods according to embodiments herein.

Further details on how the present action may be embodied are described separately below in connection with FIG. 3. Examples of how the head-end system 120 may communicate the data to and/or from the RAN 110 will also be described separately below.

Said communication of the data between the RAN 110 and said one or more radio head apparatuses 140a-b typically comprise conversion of what is sent and/or received between the head-end system 120 and the RAN 110, e.g. from, and/or to, a digital signal, to and/or from the communication IF bands. In case of a digital signal the conversion involves a digital-to analogue conversion, and/or analogue-to-digital conversion, together with frequency conversion, such as frequency shifting, to and/or from the one or more communication IF bands. In case a radio signal is used in the communication to and/or from the RAN 110, frequency conversion, such as frequency shifting, to and/or from the one or more communication IF bands may be sufficient.

Action 206

The one or more radio head apparatuses communicates, based on the received one or more configuration instructions, the data between the head-end system 120 and said one or more wireless devices 150a-d, via the broadcast of the one or more radio signals in the cable network 130, and via wireless transmission, to and/or from the one or more wireless devices 150a-d, using the communication RFs.

Further details on how the present action may be embodied are described separately below in connection with FIG. 3.

Said communication of the data between the one or more radio head apparatuses 140a-b and the one or more wireless devices 150a-d typically comprise conversion of what is sent and/or received between the head-end system 120 and the one or more radio head apparatuses 140a-b, that is, e.g. from, and/or to, the one or more radio signals located within the one or more communication IF bands, to and/or from the communication RFs. The conversion typically involve frequency conversion, such as frequency shifting, between the communication IF band and the communication RFs, in accordance with how each communication IF band relates to the communications RFs.

The method presented above and relating to actions 201-206 offers flexible extension to a conventional RAN corresponding to the RAN 110, and may utilize already existing cable networks e.g. corresponding to the cable network 130, that may be common and already in place in many building but often with poorly or not fully utilized bandwidth that the embodiments herein thus utilize. Moreover, embodiments herein enable coexistence with one or more other communication technologies utilizing the cable network for communication at the same time, even in the same frequency spectrum, where e.g. the communication IF bands mentioned above may be interleaved with frequency bands used by said other communication technologies. Embodiments herein may also be used to provide improved, or even enable, indoor radio coverage where this else is difficult or impossible to accomplish, e.g. because of electromagnetic shielding of or in a building. Embodiments herein may also be used to increase capacity for serving wireless devices located indoor. It should also be realized that an implementation of embodiments herein may offer a more cost efficient alternative to a conventional base station. In heterogeneous wireless communication systems, with smaller cells, e.g. pico cells, located inside larger, e.g. macro cells, the present method and head end system may be used to accomplish one or more of the smaller cells. The macro cell may be e.g. served by the base station 113 being a macro base station.

Action 207

At least in embodiments, as described above under action 204, where two or more radio head apparatuses, e.g. both the radio head apparatuses 140*a-b*, have been instructed to use one and the same communication IF band, the head-end system 120 may identify a condition indicating a situation for reconfiguration, and in response thereto perform actions 208-209 below. The condition may be based on an identified at least a risk for overload of some resources involved in the communication of data using the one and the same communication IF band, e.g. resources associated with a baseband signal, or cell, of the RAN 110, mapping to said one and the same communication IF band. The identified condition may e.g. be based on receipt of a signal from the RAN 110, which signal may simply act as a trigger, without the head-end system 120 actually having to know what reason is underlying sending of the signal.

Action 208

The head-end system 120 may identify a subset of the two or more radio head apparatuses 140*a-b*, e.g. the radio head apparatus 140*a*, which subset provides radio coverage for a subgroup of at least one wireless device, e.g. wireless devices 150*a-b*, among the one or more wireless devices 150*a-d*.

Different techniques may be used for identifying the subset, e.g. the radio head apparatus 140*a*, e.g. by localizing and/or determining which of the two or more of the radio head apparatuses 140*a-b* that provide(s) coverage for the subgroup of at least one wireless device, e.g. wireless devices 150*a-b*. There may e.g. be power measurements performed by each radio head apparatuses 140*a-b* and that are communicated to the head-end system 120. These measurements may e.g. be communicated using one or more of the control IF bands mentioned above. The head end system 120 may, based on the measurements, determine which of the radio-head apparatuses 140*a-b* that exhibit(s) too high load on the uplink, e.g. based on some threshold value, and thereby identify such radio head apparatus as the subset.

Action 209

The head-end system 120 may then send, to the identified subset, e.g. the radio head apparatus 140*a*, one or more reconfiguration instructions instructing to use another one or more communication IF bands that are separate from the one or more communication IF bands already in use.

Action 210

The head-end system 120 may then communicate a part of the data associated with the subgroup of at least one wireless device, e.g. the wireless devices 150*a-b*, using the another one or more communication IF bands instead of the one or more communication IF bands already in use.

Action 210

Correspondingly, the one or more radio head apparatuses 140*a-b* may then communicate a part of the data associated with the subgroup of at least one wireless device, i.e. here wireless devices 150*a-b*, using the another one or more communication IF bands instead of the one or more communication IF bands already in use.

As should be realized from the actions above, it is provided a very flexible and scalable solution that may be used to adapt to increasing capacity demands, e.g. in a high load situation, where e.g. the RAN 110 for example may add a baseband signal, that may correspond to adding a cell, i.e. increasing the number of cells, which added baseband signal may map to one of said another communication IF bands. The communication RFs already used, according to the previous configuration, by the subset, e.g. by the radio head apparatuses 140*a*, may continue to be used but now instead map to another communication IF band. It is also possible to change communication RFs, e.g. if it is desirable that the new cell shall use different communication RFs than an original cell. The remaining of the two more radio head apparatuses, i.e. excluding the subset, e.g. radio head apparatus 140*b*, may continue to communicate according the previous configuration and may continue to map to the original cell.

Further exemplary details on how the actions 205-206 discussed above may be embodied, will now be described with reference to the combined signaling diagram and flowchart depicted in FIG. 3. Action 205 relate to communicating the data between the RAN 110 and head-end system 120. Action 206 relates to communicating the data between the one or more radio head apparatuses 140*a-b* and said one or more wireless devices 150*a-d*. Said actions 205-206 may correspond to or comprise relevant parts of the following actions that may be taken in any suitable order and may be combined.

Action 301

The one or more radio head apparatuses 140*a-b* may receive, from the one or more wireless devices 150*a-d*, a wireless device uplink radio signal within the communication RFs. The wireless device uplink radio signal may comprise downlink data that is at least part of said data being communicated.

Action 302

The one or more radio head apparatuses 140*a-b* may convert the wireless device uplink radio signal to an IF uplink radio signal within an uplink IF band of said one or more communication IF bands.

Action 303

The one or more radio head apparatuses 140*a-b* may send the IF uplink radio signal by broadcast in the cable network 130. The head-end system 120 may receive, from the cable network 130, said IF uplink radio signal within the uplink IF band.

Action 304

The head-end system 120 may convert the received IF uplink radio signal to a RAN uplink signal for communication with the RAN 110. The RAN uplink signal may map to an uplink baseband signal of the RAN.

Action 305

The head-end system 120 may send to the RAN uplink signal to the RAN (110). To where in the RAN and how the RAN uplink signal may be sent and in what format, is discussed separately herein.

It may be noted that actions 301-305 relate to communication in an uplink direction.

Action 306

The head-end system 120 may receive, from the RAN 110, a RAN downlink signal that is based on a downlink baseband signal of the RAN and that may comprise downlink data that is at least part of said data being communicated.

Action 307

The head-end system 120 may convert the RAN downlink signal to an IF downlink radio signal within a downlink IF band of said one or more communication IF bands.

Action 308

The head-end system 120 may send the IF downlink radio signal by broadcast in the cable network 130. The one or more radio head apparatuses 140a-b may receive, from the cable network, the IF downlink radio signal within the downlink IF band.

Action 309

The one or more radio head apparatuses 140a-b may convert the received IF downlink radio signal to an wireless device downlink radio signal within the communication RFs.

Action 310

The one or more radio head apparatuses 140a-b may sending the wireless device downlink radio signal to the one or more wireless devices 150a-d.

It may be noted that actions 306-310 relate to communication in a downlink direction.

Note that the uplink and downlink IF bands typically are different IF bands, which typically is preferred, but may be the same depending on RAT involved. In case of the same IF band, content may be separated by time division as discussed above.

One or more control IF bands that may be separate from said one or more communication IF bands and that may be used specifically for control communication between the head-end system 120 and the one or more radio head apparatuses 140a-b, will now be separately and further commented.

The one or more control IF bands may preferably be comprised in, e.g. selected from, the available IFs explained above.

The configuration instructions in e.g. action 204 above may be sent, and/or the information on properties of the one or more radio head apparatuses in action 202 may beneficially be obtained using the one or more control IF bands.

The one or more control IF bands may be specific for control communication between the head-end system 120 and the one or more radio head apparatuses 140a-b, and may be one or more IF bands only used for this purpose. As the cable network 130 typically always offers spare capacity for one or more control IF band that can be relatively narrow banded, and since means for this kind of control communication and "infrastructure" for this is already in place in both the head-end system 120 and the radio-head apparatuses 140a-b, it is typically implementation efficient, most cost efficient and also a robust solution to perform control communication over the cable network 130 using the one or more control IF bands. However, in some embodiments this kind of control communication may instead or also take part over another physical communication link or network. The one or more control IF bands are typically one or two, e.g. one for uplink and one for downlink control communication. They may be predefined and/or predetermined, and e.g. set or determined in connection with installation of the head-end system 120 and/or radio head apparatuses 140a-b, e.g. when the head-end system 120 and/or radio head apparatuses 140a-b are being connected to the coaxial distribution system 130. The head-end system 120 and/or radio head apparatuses 140a-b may thereafter have all relevant information available for using the one or more control IF bands.

The one or more control IF bands are typically separated in frequency from the one or more communication IF bands, but in some embodiments time division may be utilized so that the one or more control IF bands at least partly overlap with the one or more communication IF bands, where control and data communication are separated by different transmission times. Control communication over the one or more control IF bands may use its own type of communication channel and/or protocol, that may have nothing to do with communication between the head-end system 120 and the RAN 110 and/or the one or more radio head apparatuses and the one or more wireless devices 150a-d, as long as the head-end system 120 and the one or more radio head apparatuses 140a-b are enabled to communicate and interpret the information being communicated as intended.

In case of a shared uplink control channel in a control IF band, contention resolution of the shared uplink control channel may employ Gigabit-Capable Passive Optical Network (GPON) Optical Network Termination Management and Control Interface (OMCI) or similar solutions, whereby the one or more radio head apparatuses 140a-b may be granted resources by the head-end prior to any uplink control message or similar is sent. Alternatively, a collision avoidance mechanism can be used over the shared control channel, e.g. as in so called Carrier Sense Multiple Access Collision Detection (CSMA/CD) and Carrier Sense Multiple Access Collision Avoidance (CSMA/CA).

The head-end system 120 and features relating to it will now be separately and further commented.

Note that several separate head-end system similar to the head-end system 120 may be used simultaneously with the coaxial distribution system 130, as long as they use separate frequencies. The head-end system 120 may be used to map any RF to any IF. It may combine, or merge, several different IFs onto the same RF. It may use at least one IF band in each direction, uplink and downlink, and that typically are separated in frequency (but time division of a common IF band is not excluded), to exchange control and other messages with the one or more radio head apparatuses 140a-b.

The head-end system 120 may use one or several bands/carriers/IF to send and receive control signals, as e.g. discussed above, to and/or from the one or more one or more radio head apparatuses 140a-b.

The head-end system 120 may instruct the one or more one or more radio head apparatuses 140a-b to operate over certain frequency bands or they may be pre-configured to do this, or the entire available bandwidth provided by the cable network 130. The one or more radio head apparatuses 140a-b may in turn be configured to sweep over relevant frequencies to locate one or several control IF bands, control channels and/or control signals as discussed above, typically one for communication in the downlink direction. After finding this, control communication with the head-end system 120 may be established, configuration instructions be obtained etc., and also other instructions, e.g. instructions to lock to another, e.g. uplink and/or downlink, control IF band and/or channel.

In some embodiments the head-end system 120 and the one or more radio head apparatuses 140a-b may provide a frequency mapping e.g. RF1-IF-RF2, e.g. mapping an RF 1900 MHz signals to an IF signal and then back to an RF 1800 MHz. signal. Some standards may prohibit such a procedure, e.g. because system information blocks in control packets may explicitly refer to an original RF band, e.g. RF1, but may still be allowed and useful in some situations.

The head-end system 120 may contain a logical table that maps un-occupied, e.g. by legacy services, IF bands, that may be grouped in various ways, onto RF bands, that also may be grouped in various ways. The table may also contain information regarding status, state and configurations of the one or more radio head apparatuses 140*a-b*.

As may be realized from the above, the head-end system 120 may contain facilities for characterizing the broadcast medium, i.e. the cable network 130 and its un-occupied IF bands.

In some embodiments, or situations, the head-end system 120 may simply forward uplink IF signals to the radio unit 112 in order to avoid some and potentially unnecessary IF/RF conversions.

The head-end system 120 may use directed antennas or other facilities to originate and terminate RF signals from and to the base station 113 when it e.g. is a macro base station as discussed above.

The head-end system 120 may communicate the data to and/or from the RAN 110 for example in the form of one or more of the following:

- A digital signal, e.g. communicated to and/or from the baseband unit 111, comprising the data, e.g. a digital baseband signal.
- A radio signal, e.g. communicated to and/or from the radio unit 112, that may use frequencies specific for the communication between the RAN 110 and the head-end system 120. In this case the radio signal may be produced by an internal radio unit of the head-end system 120 and CPRI (Common Public Radio Interface) or similar protocol may be used to communicate with the radio unit 112 that may be remotely located with the baseband unit 111.
- A radio signal, e.g. communicated to and/or from the base station 113, that may use RFs that are the same as the communication RFs. For example when the base station 113 is a macro base station. In this case the head-end system 120 may act as a layer 1 radio relay between the one or more radio head apparatuses 140*a-b* and the base station 113. For that purpose, the head-end system 120 may comprise a directed antenna towards the base station 113. From the macro network, one possible model is then to treat the head-end system 120 as a (virtual) sector.

A combination of the above is also possible, For example, the head-end system 120 may switch between macro layer operation, e.g. when data traffic and or signalling loads over the radio head apparatuses 140*a-b* are low, and operating directly over the radio unit 112 and/or baseband unit, e.g. as a cell of its own, when the load is higher. As another example, the head-end system 120 may employ both variants simultaneously for different combinations of radio access and/or operators. A yet other example is to switch to operating with the base station 113 as a macro base station if e.g. other operation, e.g. the radio unit 112, fails, or vice versa.

The one or more radio head apparatuses 140*a-b* will now be separately and further commented.

The one or more radio head apparatuses 140*a-b* may operate over a broadcast medium, i.e. the cable network 130, which is contrary to e.g. a so called Radio Dot System radio head, which is a point-to-point system that may be used between radio heads and a radio unit.

The one or more radio head apparatuses 140*a-b* may respectively contain facilities to characterize and calibrate its connection to the head-end system 120.

The one or more radio head apparatuses 140*a-b* may, similar as the head-end system 120, eavesdrop on data traffic in the cable network 130 to identify which frequency bands are already in use. The one or more radio head apparatuses 140*a-b* may select used IF bands in order to e.g. find and identify a downstream control channels provided by the head-end system 120. The one or more radio head apparatuses 140*a-b* may then synchronize which such a control channel, e.g. use information broadcasted over this channel to take the next steps in establishing control connectivity with the head-end system 120 (upstream and downstream), and may ultimately identify which IFs to use for uplink and/or downlink communication.

Alternatively, in some embodiments, the one or more radio head apparatuses 140*a-b* may be preconfigured to operate over specific IF bands.

In some embodiments the one or more radio head apparatuses 140*a-b* may alternatively or additionally obtain one or more of the available IFs in the cable network 130. It may be any of the radio head apparatuses 140*a-b* that identifies and may even chose a free control IF band for uplink communication and make the head-end system 120 aware of this, e.g. combined with the methods outlined above.

In some embodiments at least two of the one or more radio head apparatuses 140*a-b* may also communicate, even directly, with each other, e.g. at the discretion of control functionality provided, e.g. from and/or via the head-end system 120, e.g. via the control IF band(s) and/or one or more control channels, as discussed above. By communicating directly is here meant that the communication is in such a way so that e.g. a radio signal within an IF band and produced by from one of the radio head apparatuses, e.g. radio head apparatus 140*a*, is broadcasted in the coaxial distribution and then used directly by another radio head apparatuses, e.g. the radio head apparatus 140*b*, i.e. without actually being used in the head-end system 120.

Note that embodiments herein allow several RANs shared or individual per radio head, e.g. according to different RATs, i.e. in a multi-RAT environment, and/or different operators, to, at the same time, utilize the head-end system 120, the coaxial distribution system 130 and the one or more radio head apparatuses 140*a-b* for communication of data to and/or from the one or more wireless devices 150*a-d*. For example the wireless device 150*a* may be served by one operator according to GSM as RAT and the wireless device 150*b* may at the same time be served by another, or the same, operator according to LTE as RAT.

Embodiments herein are compatible with many different RATs, i.e. multi-RAT, e.g. LTE, WCDMA/HSPA, GSM, WFi etc. and also multi-operator environments.

Also note that embodiments herein may be extended with utilization of feedback from measurement reports that the one or more wireless devices 150*a-d* may send to the RAN 120. The head-end system 120 may then be configured to re-farm IF usage so as to mitigate interference of adjacent radio head apparatuses by e.g. connecting them to one and the same baseband unit. Any radio optimization scheme can be envisaged to be used in the setup according to embodiments herein.

Embodiments herein also provides means to grow, depending on radio access capacity demands from the users served. Contrary to so called radio-over-copper, which is a point-to-point solution, embodiments herein utilize the cable network as a broadcast medium. Embodiments herein enable scalable and cost effective indoor radio service provisioning over coaxial based transmission systems in particular as based on HFC and DAS.

Some further advantages and benefits related to embodiments herein are listed in the following:

One of the most proliferated indoor transport technologies is via coaxial cables. Coaxial cables are widely used for indoor radio distributed antenna systems and by cable TV operators using HFC. By means of embodiments herein it is enabled to make use of those facilities to further penetrate with radio solutions indoor. This may be done in parallel with provision of legacy services over the coaxial cables.

By using the communication IF bands in un-occupied parts, a "stacking" of multiple IFs over existing cable networks is accomplished, and in principle any RF signal may be mapped onto any communication IF band. This may advantageously be used dynamically, e.g. as in the above embodiments enabling to e.g. dynamically split cells, and also combine, based on demand or load.

For indoor coverage, macro network and head-end specific radio facilities may be combined to achieve redundant solutions as well as to achieve full operational flexibility with respect to radio access technologies supported and multi-operator support. This will provide a very flexible eco-system that can grow as traffic grows.

Eventually, all connected indoor devices may migrate to wireless connectivity, e.g. by means of 3GPP, WFi, ZigBee, Bluetooth and other radio standards or ad-hoc standards. This may be the case for both human centric devices and communication as well as machine-to-machine. Ultimately there may be need for only very low capex (capital expenditure) and opex (operational expenditure) antennas to be deployed in the premises where users and devices need wireless connectivity. Embodiments herein are compatible with any and multiple RATs and allows radio antennas, comprised in the one or more radio head apparatuses for the wireless transmission to and/or from the one or more wireless devices 150a-d, that may be compatible with multiple RATs and thus share resources and mitigating costs per individual radio head apparatus and antenna.

Figure 4:
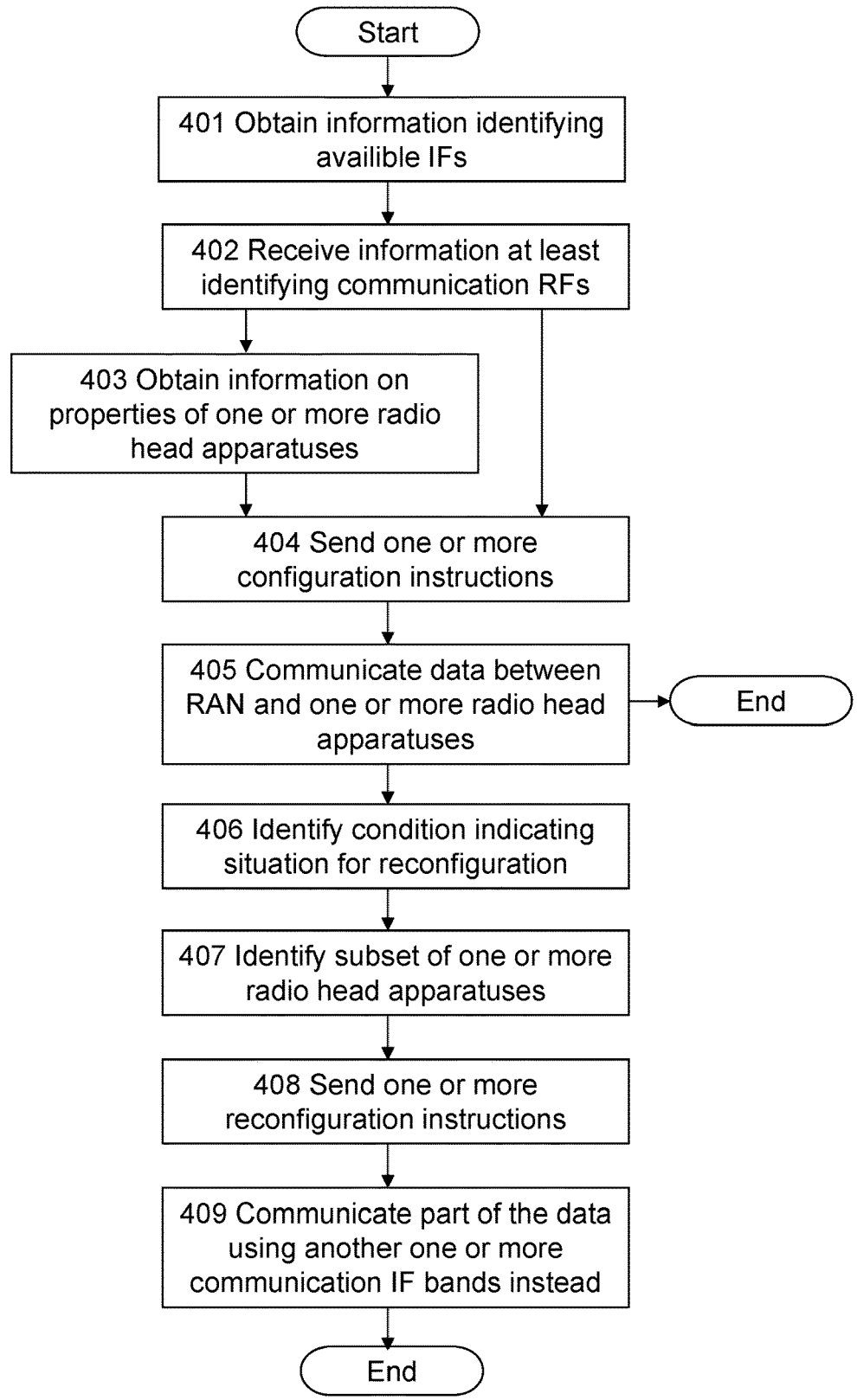
FIG. 4 is a flow chart illustrating a method performed by a head-end system according to embodiments herein.

Embodiments herein relating to a method, performed by the head-end system 120, for managing communication of data between the RAN 110 of the wireless communications system 100 and one or one or more wireless devices, for example and in the following referred to as the one or more wireless devices 150a-d, will in addition to what has been described above now be further elaborated and described with reference to the flowchart depicted in FIG. 4. As already mentioned, the head-end system 120 and the or more radio head apparatuses 140a-b are connected to the cable network 130 for wired transmission of radio signals.

The method comprises the following actions, which actions may be taken in any suitable order. Further, actions may be combined.

Action 401

The head-end system 120 obtains information identifying available IFs associated with the cable network 130, which available IFs are un-occupied frequencies in the cable network 130.

This action may fully or partly correspond to the action 201 discussed above.

Action 402

The head-end system 120 receives, from the RAN 110, information at least identifying communication RFs to be used in wireless communication of the data between the RAN 110 and said one or more wireless devices 150a-d.

This action may fully or partly correspond to the action 202 discussed above.

Action 403

The head-end system 120 may obtain information on properties of the one or more radio head apparatuses 140a-b. The one or more configuration instructions may be sent in response to verification, based on the obtained information, that the one or more radio head apparatuses 140a-b are suitable to be used for the communication of data.

The information on properties may be obtained and/or the configuration instructions may be sent, over the cable network 130 by using one or more control IF bands comprised in the available IFs. The one or more control IF bands may be separate from said one or more communication IF bands.

This action may fully or partly correspond to the action 203 discussed above.

Action 404

The head-end system 120 sends, to the one or more radio head apparatuses 140a-b, one or more configuration instructions. The configuration instructions identify the communication RFs, and one or more communication IF bands comprised in the available IFs. The one or more configuration instructions also instruct the one or more radio head apparatuses 140a-b to use the communication RFs for communication with the one or more wireless devices 150a-d, to use the one or more communication IF bands for communication over the cable network 130, and how each communication IF band relates to the communications RFs.

In some embodiments, the one or more configuration instructions further instructs two or more of the radio head apparatuses 140a-b to use one and the same communication IF band among the one or more communication IF bands, and the same communication RF frequencies.

This action may fully or partly correspond to the action 204 discussed above.

Action 405

The head-end system 120 communicates the data between the RAN 110 and said one or more radio head apparatuses 140a-b, via broadcast of one or more radio signals in the cable network 130. The one or more radio signals comprise the data and are located within the one or more communication IF bands.

In some embodiments, each one of the one or more communication IF bands is being used to communicate a respective part of the data being communicated, which respective part maps to a respective baseband signal in the RAN 110.

This action may fully or partly correspond to the action 205 discussed above.

Action 406

In embodiments, as mentioned above, where the two or more of the radio head apparatuses 140a-b have been instructed to use one and the same communication IF band among the one or more communication IF bands and the same communication RF frequencies, the head-end system 120 may identify a condition indicating a situation for reconfiguration. In response to the identification the head-end system 120 may perform actions 407-409 below.

This action may fully or partly correspond to the action 207 discussed above.

Action 407

The head-end system 120 may identify a subset of one or more radio head apparatuses, e.g. the radio head apparatus 140a, among said two or more of the radio head apparatuses 140a-b. The subset provides radio coverage for a subgroup of at least one wireless device, e.g. wireless devices 150a-b.

This action may fully or partly correspond to the action 208 discussed above.

Action 408

The head-end system 120 may then send, to the subset of one or more radio head apparatuses, that is e.g. the radio head apparatus 140a, one or more reconfiguration instructions. The one or more reconfiguration instructions instructs to use another one or more communication IF bands that are separate from the one or more communication IF bands already in use.

This action may fully or partly correspond to the action 209 discussed above.

Action 409

The head-end system may thereafter communicate a part of the data associated with the subgroup of at least one wireless device, that is e.g. wireless devices 150a-b, by using the another one or more communication IF bands instead of the one or more communication IF bands already in use.

This action may fully or partly correspond to the action 210 discussed above.

Figure 5:
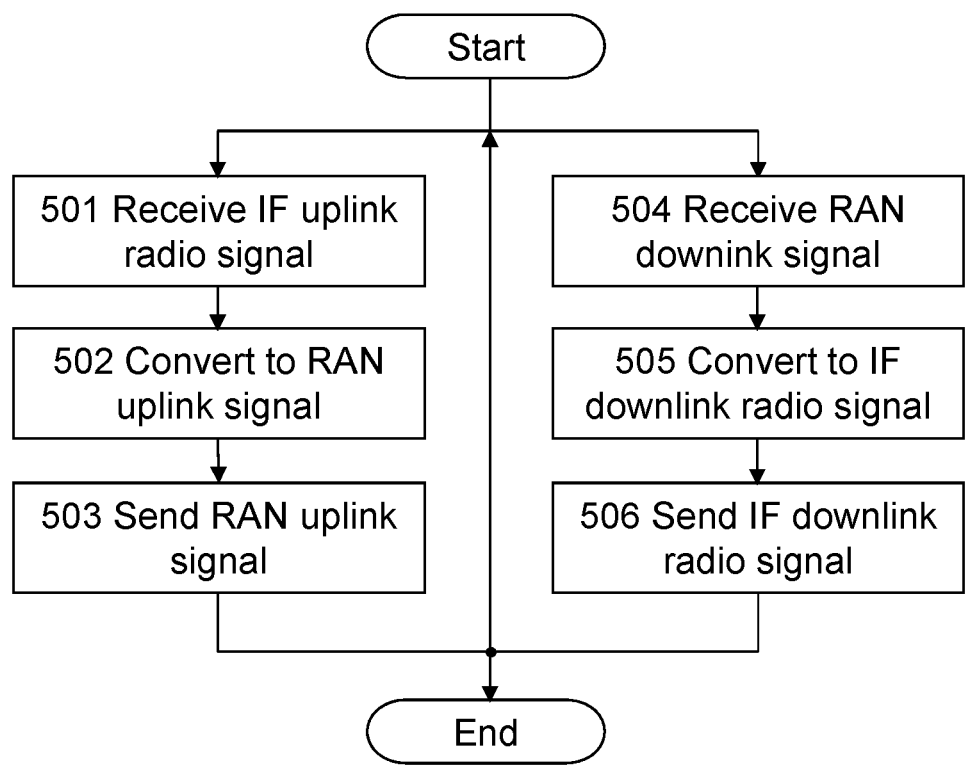
FIG. 5 is a flow chart illustrating actions performed by the head-end system in some embodiments herein.

Further embodiments herein, particularly relating to action 405 above regarding communication of the data between the RAN 110 and said one or more radio head apparatuses 140a-b, will now be further elaborated and described with reference to the flowchart depicted in FIG. 5. Action 405 may comprise one or more of the following actions, which actions may be taken in any suitable order. Further, actions may be combined.

Action 501

The head-end system 120 receives, from the cable network 130, an IF uplink radio signal within an uplink IF band of said one or more communication IF bands. The IF uplink radio signal is broadcasted in the cable network 130 by at least one of said one or more radio head apparatuses 140a-b and comprises uplink data that is at least part of said data being communicated.

This action may fully or partly correspond to the action 303 discussed above.

Action 502

The head-end system 120 converts the received IF uplink radio signal to a RAN uplink signal for communication with the RAN 110. The RAN uplink signal maps to an uplink baseband signal of the RAN.

This action may fully or partly correspond to the action 304 discussed above.

Action 503

The head-end system 120 sends the RAN uplink signal to the RAN 110.

This action may fully or partly correspond to the action 305 discussed above.

Action 504

The head-end system 120 receives, from the RAN 110, a RAN downlink signal. The RAN downlink signal is based on a downlink baseband signal of the RAN 110. The downlink baseband signal of the RAN 110 comprises downlink data that is at least part of said data being communicated.

This action may fully or partly correspond to the action 306 discussed above.

Action 505

The head-end system 120 converts the RAN downlink signal to an IF downlink radio signal within a downlink IF band of said one or more communication IF bands.

This action may fully or partly correspond to the action 307 discussed above.

Action 506

The head-end system 120 sends the IF downlink radio signal by broadcast in the cable network, for receipt by said at least one of said one or more radio head apparatuses 140a-b.

This action may fully or partly correspond to the action 308 discussed above.

Figure 6:
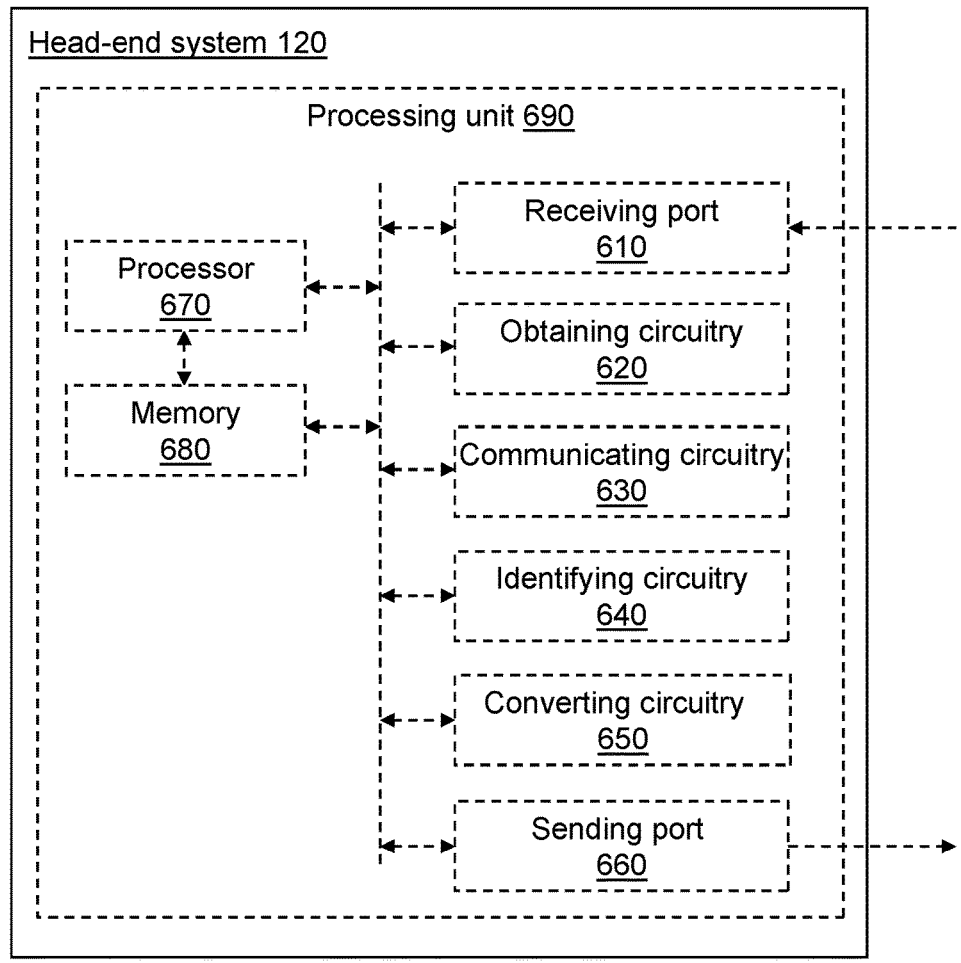
FIG. 6 is a flow chart illustrating a method performed by a radio head apparatus according to embodiments herein.

To perform the actions 401-409 and 501-506 above for managing communication of data between the RAN 110 of the wireless communications system 100 and the one or more wireless devices 150a-d, the head-end system 120 may comprise an arrangement schematically depicted in FIG. 6.

The head-end system 120, e.g. an obtaining circuitry 620 or a receiving port 610 comprised in the head-end system 120, is configured to obtain said information identifying the available IFs associated with the cable network 130.

The head-end system 120, e.g. the receiving port 610, is further configured to receive, from the RAN 110, said information at least identifying communication RFs.

Moreover, the head-end system 120, e.g. a sending port 660 comprised in the head-end system 120, is configured to send, to the one or more radio head apparatuses 140a-b, said one or more configuration instructions.

Furthermore, the head-end system 120, e.g. a communicating circuitry 630 comprised in the head-end system 120, is configured to communicate said data between the RAN 110 and said one or more radio head apparatuses 140a-b, via broadcast of said one or more radio signals in the cable network 130.

In some embodiments the head-end system 120, e.g. the communicating circuitry 630, is also configured to use each one of the one or more communication IF bands to communicate a respective part of the data being communicated, which respective part maps to a respective baseband signal in the RAN 110.

In some embodiments, the head-end system 120, e.g. an identifying circuitry 640 comprised in the head-end system 120, is configured to identify said condition indicating said situation for reconfiguration. Further, the head-end system 120, e.g. the identifying circuitry 640, may be configured to identify said subset of one or more radio head apparatuses 140a among said two or more of the radio head apparatuses 140a-b. The head-end system, e.g. the sending port 660, may be configured to send, to said subset of one or more radio head apparatuses, said one or more reconfiguration instructions. Moreover, the head-end system 120, e.g. the communicating circuitry 630, may be configured to communicate said part of the data associated with the subgroup of at least one wireless device using said another one or more communication IF bands instead of the one or more communication IF bands already in use.

In some embodiments the head-end system 120, e.g. the obtaining circuitry 620, may be configured to obtain said information on properties of the one or more radio head apparatuses. The head-end system 120, e.g. the sending port 660, may be configured to send, to the one or more radio head apparatuses 140a-b, the one or more configuration instructions in response to verification, based on the obtained information, that the one or more radio head apparatuses 140a-b are suitable to be used for the communication of data.

In some embodiments, the head-end system 120, e.g. the sending port 660, is configured to send the configuration instructions and/or obtain the information on properties of the one or more radio head apparatuses 140a-b, over the cable network 130 by using said one or more control IF bands comprised in the available IFs.

Moreover, in some embodiments, the head-end system 120, e.g. the receiving port 610, is configured to receive, from the cable network 130, said IF uplink radio signal within said uplink IF band. The head-end system 120, e.g. a converting circuitry 650, may be configured to convert the received IF uplink radio signal to said RAN uplink signal for communication with the RAN 110, and which RAN uplink signal maps to an uplink baseband signal of the RAN. The head-end system 120, e.g. the sending port 660, may be configured to send the RAN uplink signal to the RAN 110.

Furthermore, in some embodiments, the head-end system 120, e.g. the receiving port 610, is configured to receive, from the RAN 110, said RAN downlink signal that is based on a downlink baseband signal of the RAN and that comprises said downlink data that is at least part of said data being communicated. The head-end system 120, e.g. the converting circuitry 650, may be configured to convert the RAN downlink signal to said IF downlink radio signal within said downlink IF band of said one or more communication IF bands. The head-end system 120, e.g., the sending port 660, may be configured to send the IF downlink radio signal by broadcast in the cable network 130, for receipt by said at least one of said one or more radio head apparatuses 140*a-b*.

Figure 8:
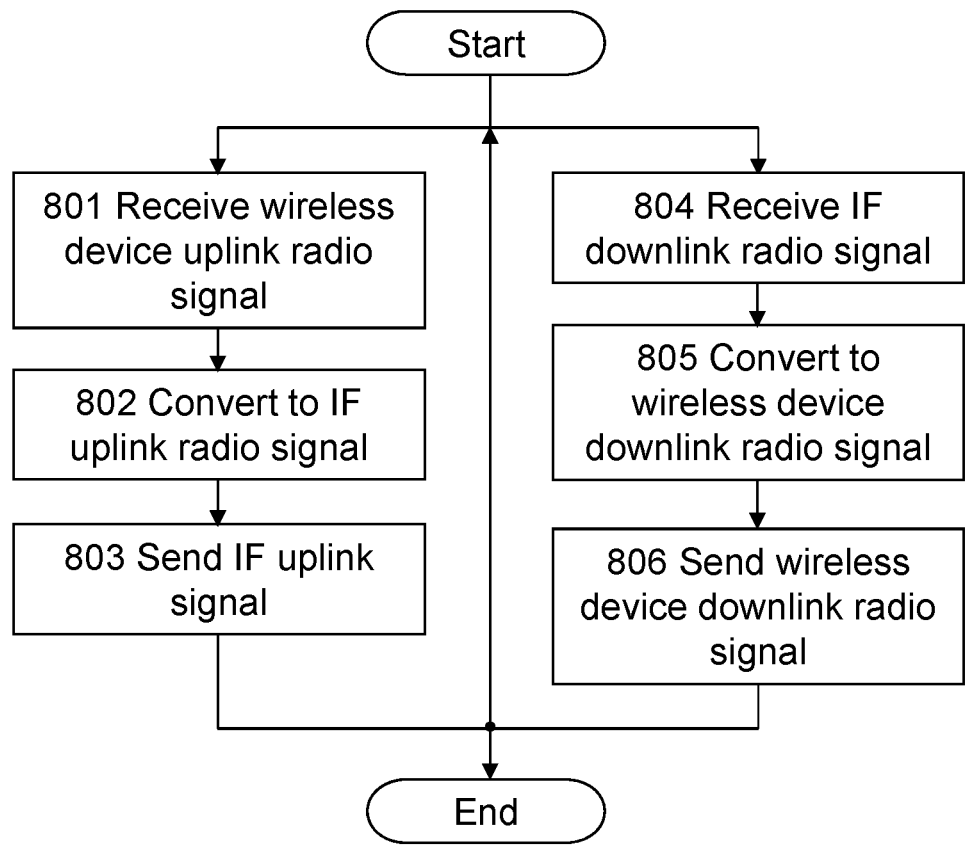
FIG. 8 is a schematic block diagram illustrating a head-end system according to embodiments herein.

The embodiments of the head-end system 120 may be fully or partly implemented through one or more processors, such as a processor 670 depicted in FIG. 8, together with a computer program for performing the functions and actions of embodiments herein. In some embodiments the circuitry discussed above may be fully or partially implemented by the processor 670.

In some embodiments, illustrated with support from the schematic drawings in FIG. 10, there is provided a computer program 1001*a* that when executed by a processor, e.g. the processor 670, causes the head-end system 120 to perform the method according to embodiments herein as described above. It is implied that the computer program comprises instructions, or code, that directly or indirectly is what the processor executes when executing the computer program 1001*a*.

Figure 10A:
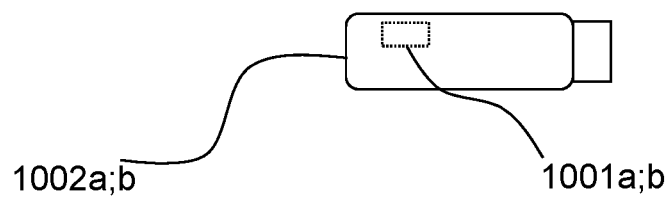
FIG. 10*a-c* are schematic drawings for illustrating embodiments related to computer program embodiments regarding the head-end system and the radio-head apparatus.
Figure 10B:
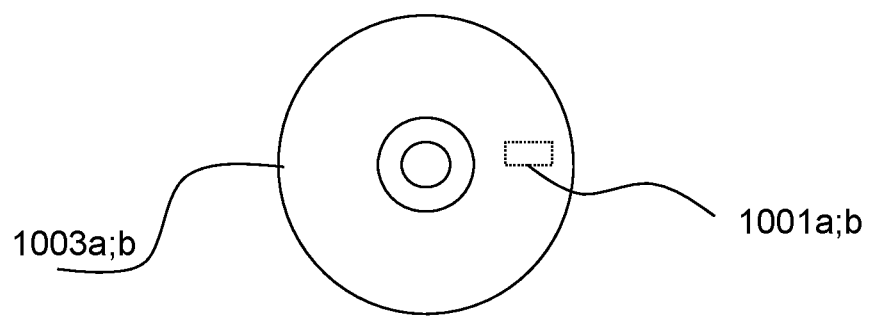
Figure 10C:
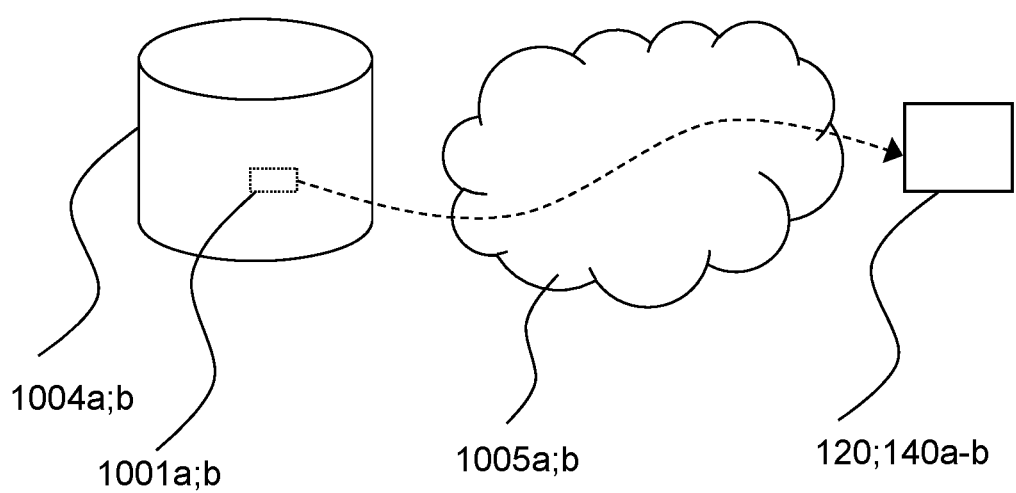

In some embodiments, also illustrated with support from the schematic drawings in FIGS. 10*a-c*, there is provided a computer program product, comprising a data carrier, such as a computer readable medium, on which the computer program 1001*a* is stored. Examples of the data carrier is a memory card or a memory stick 1002*a* as in FIG. 10*a*, a disc storage medium 1003*a* such as a CD or DVD as in FIG. 10*b*, a mass storage device 1004*a* as in FIG. 10*c*. The mass storage device 1004*a* is typically based on hard drive(s) or Solid State Drive(s) (SSD). The mass storage device 1004*a* may be such that is used for storing data accessible over a computer network 1005*a*, e.g. the Internet or a Local Area Network (LAN).

The computer program 1001*a* may furthermore be provided as a pure computer program or comprised in a file or files. The file or files may be stored on the data carrier and e.g. available through download e.g. over the computer network 1005*a*, such as from the mass storage device 1004*a* via a server. The server may e.g. be a web or ftp server. The file or files may e.g. be executable files for direct or indirect download to and execution on the head-end system 120, e.g. on the processor 670, or may be for intermediate download and compilation involving the same or another processor to make them executable before further download and execution.

The head-end system 120 may further comprise a memory 680 comprising one or more memory units. The memory 680 is arranged to store data, such as configurations and/or applications involved in or for performing the functions and actions of embodiments herein.

Those skilled in the art will also appreciate that the ports and circuitry 610-660 may refer to a combination of analog and digital circuits, and/or one or more processors configured with software and/or firmware (e.g., stored in memory) that, when executed by the one or more processors such as the processor 670, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

As a further example, the head-end system 120 may comprise a processing unit 690, which may comprise one or more of the circuit(s) and/or port(s) etc. mentioned above. As used herein, the term "processing circuit" may relate to a processing unit, a processor, an application specific integrated circuit (ASIC), a field-programmable gate array (FPGA) or the like. As an example, a processor, an ASIC, an FPGA or the like may comprise one or more processor kernels. In some examples, the processing circuit may be embodied by a software and/or hardware module.

Figure 7:
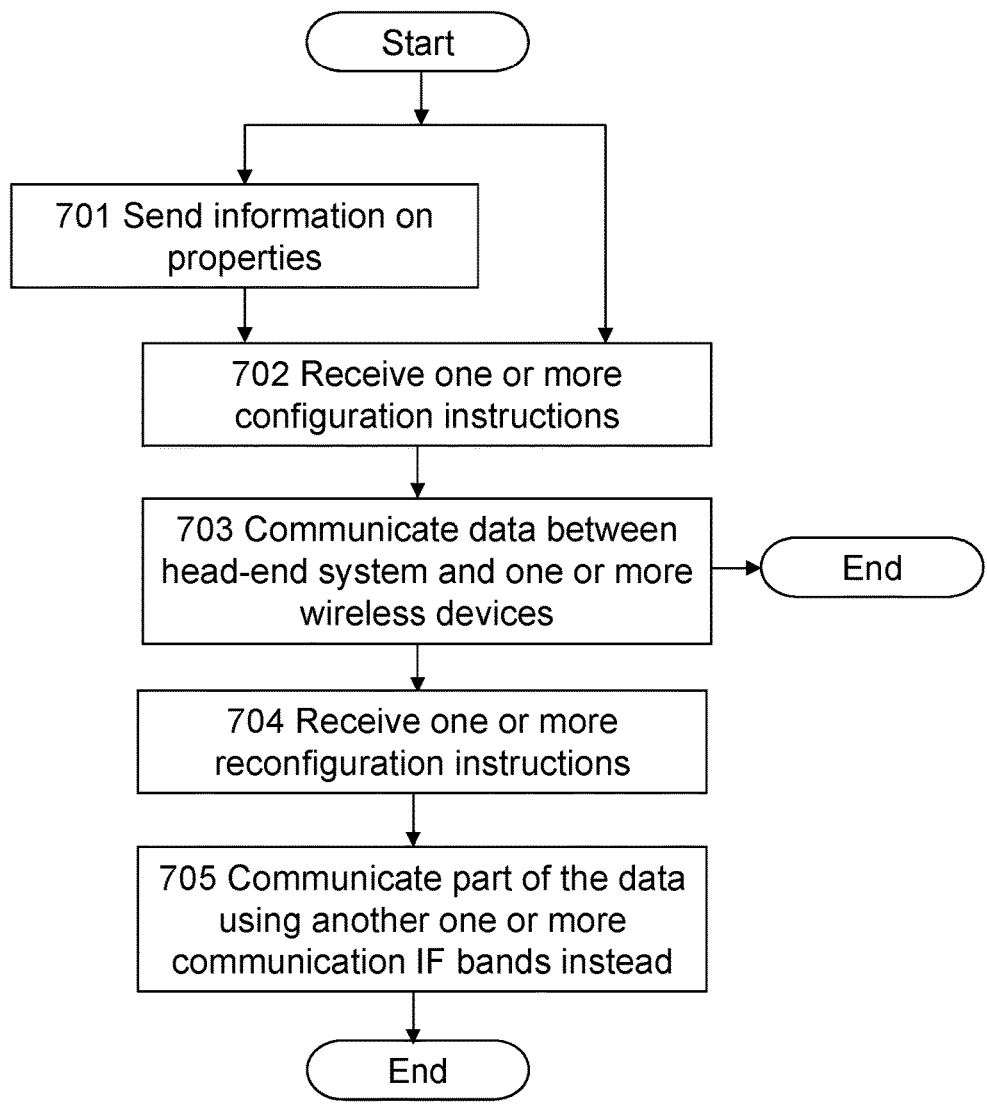
FIG. 7 is a flow chart illustrating actions performed by the radio head apparatus in some embodiments herein.

Embodiments herein relating to a method, performed by the radio head apparatus 140*a* and/or 140*b*, for managing communication of data between the RAN 110 and one or one or more wireless devices, for example and in the following referred to as the one or more wireless devices 150*a-d*, will in addition to what has been described above now be further elaborated and described with reference to the flowchart depicted in FIG. 7. The radio head apparatus 140*a* and/or 140*b* will in the following, for simplicity, be referred to as the radio head apparatus 140*a*. As already mentioned, the radio head apparatus 140*a* and the head-end system 120 are connected to the cable network 130 for wired transmission of radio signals.

The method comprises the following actions, which actions may be taken in any suitable order. Further, actions may be combined.

Action 701

The radio head apparatus 140*a* may send, to the head-end system 120, information on properties of the radio head apparatus 140*a*.

This action may fully or partly correspond to the action 203 discussed above.

Action 702

The radio head apparatus 140*a* receives, from the head-end system 120, one or more configuration instructions. The configuration instructions identify communication RFs, and one or more communication IF bands. The one or more communication IF bands are comprised in available IFs that are associated with the cable network 130. The available IFs are un-occupied frequencies in the cable network 130. The one or more configuration instructions further instructs the radio head apparatus 140*a* to use the communication RFs for communication with the one or more wireless devices 150*a-d*, to use the one or more communication IF bands for communication over the cable network 130, and how each communication IF band relates to the communications RFs.

The configuration instructions may be received, and/or the information on properties may be sent, over the cable network 130 by using one or more control IF bands comprised in the available IFs. The one or more control IF bands may be separate from said one or more communication IF bands.

This action may fully or partly correspond to the action 204 discussed above.

Action 703

The radio head apparatus 140*a* communicates, based on the received one or more configuration instructions, the data between the head-end system 120 and said one or more wireless devices 150*a-d*, via broadcast of one or more radio signals in the cable network 130. The one or more radio signals comprise the data and are located within the one or more communication IF bands. The data between the head-end system 120 and said one or more wireless devices 150*a-d* is also communicated via wireless transmission, to and/or from the one or more wireless devices 150*a-d*, using the communication RFs.

In some embodiments, each one of the one or more communication IF bands is being used to communicate a respective part of the data being communicated, which respective part maps to a respective baseband signal in the RAN 110.

This action may fully or partly correspond to the action 206 discussed above.

Action 704

The radio head apparatus 140*a* may receive, from the head-end system 120, one or more reconfiguration instructions instructing the radio head apparatus 140*a* to use another one or more communication IF bands that are separate from the one or more communication IF bands already in use.

This action may fully or partly correspond to the action 209 discussed above.

Action 705

The radio head apparatus 140*a* may further communicate a part of the data associated with a subgroup of at least one wireless device, e.g. the wireless devices 150*a-b*, among the one or more wireless devices 150*a-d*, using said another one or more communication IF bands instead of the one or more communication IF bands already in use.

This action may fully or partly correspond to the action 211 discussed above.

Further embodiments herein, particularly relating to action 703 above regarding communication of the data between the head-end system 120 and the one or more wireless devices 150*a-d*, will now be further elaborated and described with reference to the flowchart depicted in FIG. 8. Action 703 may comprise one or more of the following actions, which actions may be taken in any suitable order. Further, actions may be combined.

Action 801

The radio head apparatus 140*a* receives, from the one or more wireless devices 150*a-b*, a wireless device uplink radio signal within the communication RFs, which wireless device uplink radio signal comprises downlink data that is at least part of said data being communicated.

This action may fully or partly correspond to the action 301 discussed above.

Action 802

The radio head apparatus 140*a* converts the wireless device uplink radio signal to an IF uplink radio signal within an uplink IF band of said one or more communication IF bands.

This action may fully or partly correspond to the action 302 discussed above.

Action 803

The radio head apparatus 140*a* may send the IF uplink radio signal by broadcast in the cable network 130, for receipt by the head-end system 120.

This action may fully or partly correspond to the action 303 discussed above.

Action 804

The radio head apparatus 140*a* may receive, from the cable network 130, an IF downlink radio signal within a downlink IF band of said one or more communication IF bands. The IF downlink radio signal may be broadcasted in the cable network 130 by the head-end system 120 and comprises downlink data that is at least part of said data being communicated.

This action may fully or partly correspond to the action 308 discussed above.

Action 805

The radio head apparatus 140*a* may convert the received IF downlink radio signal to an wireless device downlink radio signal within the communication RFs.

This action may fully or partly correspond to the action 309 discussed above.

Action 806

The radio head apparatus 140*a* may send the wireless device downlink radio signal to the one or more wireless devices 150*a-b*.

This action may fully or partly correspond to the action 310 discussed above.

To perform the actions 701-705 and 801-806 above for managing communication of data between the RAN 110 and the one or more wireless devices 150*a-d*, the radio head apparatus 140*a* and/or 140*b* (but in the following only the radio head apparatus 140*a* will be referred to for simplicity), may comprise an arrangement schematically depicted in FIG. 9.

The radio head apparatus 140*a*, e.g. a receiving port 910 comprised in the radio head apparatus 140*a*, is configured to receive, from the head-end system 120, said one or more configuration instructions.

The radio head apparatus 140*a*, e.g. a communicating circuitry 920 comprised in the radio head apparatus 140*a*, is configured to communicate, based on the received one or more configuration instructions, the data between the head-end system 120 and said one or more wireless devices 150*a-d*, via the broadcast of said one or more radio signals in the cable network 130 and via wireless transmission, to and/or from, the one or more wireless devices 150*a-d*, using the communication RFs.

In some embodiments the radio head apparatus 140*a*, e.g. the communicating circuitry 920, is also configured to use each one of the one or more communication IF bands to communicate said respective part of the data being communicated, which respective part maps to a respective baseband signal in the RAN 110.

In some embodiments the radio head apparatus 140*a*, e.g. the receiving port 910, is configured to receive, from the head-end system 120, said one or more reconfiguration instructions. Moreover, the radio head apparatus 140*a*, e.g. the communicating circuitry 920, may be configured to communicate said part of the data associated with the subgroup of at least one wireless device using said another one or more communication IF bands instead of the one or more communication IF bands already in use.

In some embodiments, the radio head apparatus 140*a*, e.g. a sending port 940 comprised in the radio head apparatus 140*a*, is configured to send, to the head-end system 120, said information on properties of the radio head apparatus 140*a*.

In some embodiments, the radio head apparatus 140*a*, e.g. receiving port 910, is further configured to receive the configuration instructions, and/or, e.g. the sending port 940, is further configured to send the information on properties, over the cable network 130, using said one or more control IF bands.

Moreover, in some embodiments, the radio head apparatus 140a, e.g. the receiving port 910, is configured to receive, from the one or more wireless devices 150a-b, said wireless device uplink radio signal. The radio head apparatus 140a, e.g. a converting circuitry 930 comprised in the radio head apparatus 140a, may be configured to convert the wireless device uplink radio signal to said IF uplink radio signal. The radio head apparatus 140a, e.g. the sending port 940, may be configured to send the IF uplink radio signal by broadcast in the cable network 130.

Furthermore, in some embodiments, the radio head apparatus 140a, e.g. the receiving port 910, is configured to receive, from the cable network 130, said IF downlink radio signal. The radio head apparatus 140a, e.g. the converting circuitry 930, may be configured to convert the received IF downlink radio signal to said wireless device downlink radio signal. The radio head apparatus 140a, e.g. the sending port 940, may be configured to send the wireless device downlink radio signal to the one or more wireless devices 150a-d.

Figure 9:
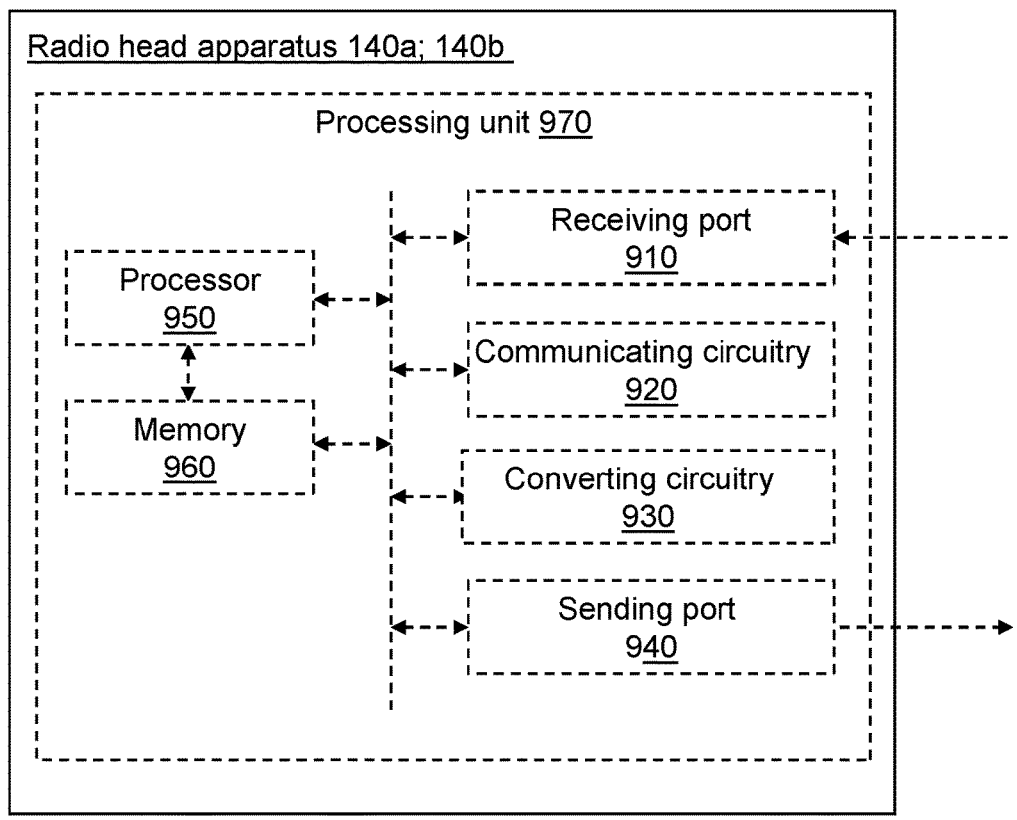
FIG. 9 is a schematic block diagram illustrating a radio head apparatus according to embodiments herein.

The embodiments of the radio head apparatus 140a may be fully or partly implemented through one or more processors, such as a processor 950 depicted in FIG. 9, together with a computer program for performing the functions and actions of embodiments herein. In some embodiments the circuitry discussed above may be fully or partially implemented by the processor 950.

In some embodiments, illustrated with support from the schematic drawings in FIGS. 10a-c, there is provided a computer program 1001b that when executed by a processor, e.g. the processor 950, causes the radio head apparatus 140a to perform the method according to embodiments herein as described above. It is implied that the computer program comprises instructions, or code, that directly or indirectly is what the processor executes when executing the computer program 1001b.

In some embodiments, also illustrated with support from the schematic drawings in FIGS. 10a-c, there is provided a computer program product, comprising a data carrier, such as a computer readable medium, on which the computer program 1001b is stored. Examples of the data carrier is a memory card or a memory stick 1002a as in FIG. 10a, a disc storage medium 1003b such as a CD or DVD as in FIG. 10b, a mass storage device 1004b as in FIG. 10c. The mass storage device 1004b is typically based on hard drive(s) or Solid State Drive(s) (SSD). The mass storage device 1004b may be such that is used for storing data accessible over a computer network 1005b, e.g. the Internet or a Local Area Network (LAN).

The computer program 1001b may furthermore be provided as a pure computer program or comprised in a file or files. The file or files may be stored on the data carrier and e.g. available through download e.g. over the computer network 1005b, such as from the mass storage device 1004b via a server. The server may e.g. be a web or ftp server. The file or files may e.g. be executable files for direct or indirect download to and execution on the head-end system 120, e.g. on the processor 950, or may be for intermediate download and compilation involving the same or another processor to make them executable before further download and execution.

The head-end system 120 may further comprise a memory 960 comprising one or more memory units. The memory 960 is arranged to store data, such as configurations and/or applications involved in or for performing the functions and actions of embodiments herein.

Those skilled in the art will also appreciate that the ports and circuitry 910-940 may refer to a combination of analog and digital circuits, and/or one or more processors configured with software and/or firmware (e.g., stored in memory) that, when executed by the one or more processors such as the processor 950, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

As a further example, the head-end system 120 may comprise a processing unit 970, which may comprise one or more of the circuit(s) and/or port(s) etc mentioned above. As used herein, the term "processing circuit" may relate to a processing unit, a processor, an application specific integrated circuit (ASIC), a field-programmable gate array (FPGA) or the like. As an example, a processor, an ASIC, an FPGA or the like may comprise one or more processor kernels. In some examples, the processing circuit may be embodied by a software and/or hardware module.

FIGS. 10a-c are schematic drawings for illustrating embodiments related to computer program embodiments and have been used and discussed above. Note that the same FIGS. 10a-c have been used to illustrate separate embodiments regarding the head-end system 120 and the radio-head apparatus 140a. The only reason for this is to avoid duplicating illustrations in FIGS. 10a-c, and shall thus not be construed as that e.g. computer programs related to the head-end system 120 and the radio-head apparatus 140a are the same and/or need to be stored together on the same data carrier. To accentuate that FIGS. 10a-c in fact show separate embodiments, different numerals have been used for the same element show in FIG. 10, e.g. there are two separate computer programs 1001a and 1001b, which may be on respective separate data carrier, e.g. the computer program 1001a on memory stick 1002a, and separate from this, the computer program 1001b on another memory stick 1002b.

As used herein, the term "memory" may refer to a hard disk, a magnetic storage medium, a portable computer diskette or disc, flash memory, random access memory (RAM) or the like. Furthermore, the memory may be an internal register memory of a processor.

As used herein, the expression "configured to" may mean that a processing circuit is configured to, or adapted to, by means of software or hardware configuration, perform one or more of the actions described herein.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

As used herein, the expression "in some embodiments" has been used to indicate that the features of the embodiment described may be combined with any other embodiment disclosed herein.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and encode the transmission.

In case of group-casting, a group of specifically addressed devices may receive and decode the transmission.

When using the word "comprise" or "comprising" it shall be interpreted as non-limiting, i.e. meaning "consist at least of".

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a head-end system, for managing communication of data between a Radio Access Network (RAN) and one or more wireless devices, the head-end system and one or more radio head apparatuses being connected to a cable network for wired transmission of radio signals, the method comprising:
   obtaining information identifying available Intermediate Frequencies (IFs) associated with the cable network, which available IFs are un-occupied frequencies in the cable network;
   receiving, from the RAN, information at least identifying communication Radio Frequencies (RFs) to be used in wireless communication of the data between the RAN and said one or more wireless devices;
   sending, to the one or more radio head apparatuses, one or more configuration instructions, the configuration instructions identifying the communication RFs, and one or more communication IF bands comprised in the available IFs, and instructing the one or more radio head apparatuses to use the communication RFs for communication with the one or more wireless devices, to use the one or more communication IF bands for communication over the cable network, and how each communication IF band relates to the communications RFs; and
   communicating the data between the RAN and said one or more radio head apparatuses, via broadcast of one or more radio signals in the cable network, which one or more radio signals comprise the data and are located within the one or more communication IF bands.

2. The method as claimed in claim 1, wherein each one of the one or more communication IF bands is being used to communicate a respective part of the data being communicated, which respective part maps to a respective baseband signal in the RAN.

3. The method as claimed in claim 1, wherein the one or more configuration instructions further instructs two or more of the radio head apparatuses to use one and the same communication IF band among the one or more communication IF bands and the same communication RF frequencies.

4. The method as claimed in claim 3, wherein the method further comprises:
   identifying a condition indicating a situation for reconfiguration, and in response thereto:
   identifying a subset of one or more radio head apparatuses among said two or more of the radio head apparatuses, which subset provides radio coverage for a subgroup of at least one wireless device among the one or more wireless devices;
   sending, to the subset of one or more radio head apparatuses, one or more reconfiguration instructions instructing the subset of one or more radio head apparatuses to use another one or more communication IF bands that are separate from the one or more communication IF bands already in use; and
   communicating a part of the data associated with the subgroup of at least one wireless device using the another one or more communication IF bands instead of the one or more communication IF bands already in use.

5. The method as claimed in claim 1, wherein the method further comprises:
   obtaining information on properties of the one or more radio head apparatuses,
   and wherein the one or more configuration instructions are sent in response to verification, based on the obtained information, that the one or more radio head apparatuses are suitable to be used for the communication of data.

6. The method as claimed in claim 1, wherein the configuration instructions are being sent, and/or the information on properties of the one or more radio head apparatuses is being obtained, over the cable network by using one or more control IF bands comprised in the available IFs and that are separate from said one or more communication IF bands.

7. The method as claimed in claim 1, wherein communicating the data between the RAN and said one or more radio head apparatuses comprises:
   receiving, from the cable network, an Intermediate Frequency (IF) uplink radio signal within an uplink IF band of said one or more communication IF bands, which IF uplink radio signal is broadcasted in the cable network by at least one of said one or more radio head apparatuses and comprises uplink data that is at least part of said data being communicated;
   converting the received IF uplink radio signal to a RAN uplink signal for communication with the RAN, which RAN uplink signal maps to an uplink baseband signal of the RAN; and
   sending the RAN uplink signal to the RAN;
   or,
   receiving, from the RAN, a RAN downlink signal that is based on a downlink baseband signal of the RAN and that comprises downlink data that is at least part of said data being communicated,
   converting the RAN downlink signal to an IF downlink radio signal within a downlink IF band of said one or more communication IF bands, and
   sending the IF downlink radio signal by broadcast in the cable network, for receipt by said at least one of said one or more radio head apparatuses.

8. A non-transitory computer readable medium comprising a computer program that when executed by a processor causes a head-end system to perform the method according to claim 1.

9. A method, performed by a radio head apparatus, for managing communication of data between a Radio Access Network (RAN) and one or more wireless devices, said radio head apparatus and a head-end system being connected to a cable network for wired transmission of radio signals, the method comprising:
   receiving, from the head-end system, one or more configuration instructions, the configuration instructions identifying communication Radio Frequencies (RFs) and one or more communication Intermediate Frequency (IF) bands, the one or more communication IF bands being comprised in available IFs that are associated with the cable network, which available IFs are un-occupied frequencies in the cable network, the one or more configuration instructions further instructing the radio head apparatus to use the communication RFs for communication with the one or more wireless devices, to use the one or more communication IF bands for communication over the cable network, and how each communication IF band relates to the communications RFs; and communicating, based on the received one or more configuration instructions, the data between the head-end system and said one or more wireless devices, via broadcast of one or more radio signals in the cable network, which one or more radio signals comprise the data and are located within the one or more communication IF bands, and via wireless transmission, to and/or from the one or more wireless devices, using the communication RFs.

10. The method as claimed in claim 9, wherein each one of the one or more communication IF bands is being used to communicate a respective part of the data being communicated, which respective part maps to a respective baseband signal in the RAN.

11. The method as claimed in claim 9, wherein the method further comprises:

receiving, from the head-end system, one or more reconfiguration instructions instructing the radio head apparatus to use another one or more communication IF bands that are separate from the one or more communication IF bands already in use; and communicating a part of the data associated with a subgroup of at least one wireless device among the one or more wireless devices using said another one or more communication IF bands instead of the one or more communication IF bands already in use.

12. The method as claimed in claim 9, wherein the method further comprises:

sending, to the head-end system, information on properties of the radio head apparatus.

13. The method as claimed in claim 9, wherein the configuration instructions are being received, and/or the information on properties is being sent, over the cable network by using one or more control IF bands comprised in the available IFs and that are separate from said one or more communication IF bands.

14. The method as claimed in claim 9, wherein communicating the data between the RAN and said one or more radio head apparatuses comprises:

receiving, from the one or more wireless devices, a wireless device uplink radio signal within the communication RFs, which wireless device uplink radio signal comprises downlink data that is at least part of said data being communicated;

converting the wireless device uplink radio signal to an IF uplink radio signal within an uplink IF band of said one or more communication IF bands; and sending the IF uplink radio signal by broadcast in the cable network, for receipt by the head-end system; and/or, receiving, from the cable network, an IF downlink radio signal within a downlink IF band of said one or more communication IF bands, which IF downlink radio signal is broadcasted in the cable network by the head-end system and comprises downlink data that is at least part of said data being communicated, converting the received IF downlink radio signal to an wireless device downlink radio signal within the communication RFs, and sending the wireless device downlink radio signal to the one or more wireless devices.

15. A non-transitory computer readable medium comprising a computer program that when executed by a processor causes a radio head apparatus to perform the method according to claim 9.

16. A head-end system for managing communication of data between a Radio Access Network (RAN) and one or more wireless devices when said head-end system and one or more radio head apparatuses are connected to a cable network for wired transmission of radio signals, the head-end system being configured to:

obtain information identifying available Intermediate Frequencies (IFs) associated with the cable network, which available IFs are un-occupied frequencies in the cable network;

receive, from the RAN, information at least identifying communication Radio Frequencies (RFs) to be used in wireless communication of the data between the RAN and said one or more wireless devices;

send, to the one or more radio head apparatuses, one or more configuration instructions, the configuration instructions identifying the communication RFs, and one or more communication IF bands comprised in the available IFs and instructing the one or more radio head apparatuses to use the communication RFs for communication with the one or more wireless devices, to use the one or more communication IF bands for communication over the cable network, and how each communication IF band relates to the communications RFs; and communicate the data between the RAN and said one or more radio head apparatuses, via broadcast of one or more radio signals in the cable network, which one or more radio signals comprise the data and are located within the one or more communication IF bands.

17. The head-end system as claimed in claim 16, further configured to use each one of the one or more communication IF bands to communicate a respective part of the data being communicated, which respective part maps to a respective baseband signal in the RAN.

18. The head-end system as claimed in claim 16, wherein the one or more configuration instructions further instructs two or more of the radio head apparatuses to use one and the same communication IF band among the one or more communication IF bands and the same communication RF frequencies.

19. The head-end system as claimed in claim 18, further configured to:

identify a condition indicating a situation for reconfiguration, and in response thereto:

identify a subset of one or more radio head apparatuses among said two or more of the radio head apparatuses, which subset provides radio coverage for a subgroup of at least one wireless device among the one or more wireless devices;

send, to the subset of one or more radio head apparatuses, one or more reconfiguration instructions instructing the subset of one or more radio head apparatuses to use another one or more communication IF bands that are separate from the one or more communication IF bands already in use; and communicate a part of the data associated with the subgroup of at least one wireless device using the another one or more communication IF bands instead of the one or more communication IF bands already in use.

20. A radio head apparatus for managing communication of data between a Radio Access Network (RAN) and one or more wireless devices when said radio head apparatus and a head-end system are connected to a cable network for wired transmission of radio signals, the radio head apparatus being configured to:

receive, from the head-end system, one or more configuration instructions, the configuration instructions identifying communication Radio Frequencies (RFs) and one or more communication Intermediate Frequency (IF) bands, the one or more communication IF bands being comprised in available IFs that are associated with the cable network, which available IFs are un-occupied frequencies in the cable network, the one or more configuration instructions further instructing the radio head apparatus to use the communication RFs for communication with the one or more wireless devices, to use the one or more communication IF bands for communication over the cable network and how each communication IF band relates to the communications RFs; and communicate, based on the received one or more configuration instructions, the data between the head-end system and said one or more wireless devices, via broadcast of one or more radio signals in the cable network, which one or more radio signals comprise the data and are located within the one or more communication IF bands, and via wireless transmission, to and/or from the one or more wireless devices, using the communication RFs.

\* \* \* \* \*